(12) United States Patent
Shah et al.

(10) Patent No.: US 11,737,093 B2
(45) Date of Patent: Aug. 22, 2023

(54) USER EQUIPMENT AND BASE STATION INVOLVED IN TRANSMISSION OF UPLINK CONTROL DATA

(71) Applicant: Panasonic Intellectual Property Corporation of America, Torrance, CA (US)

(72) Inventors: Rikin Shah, Langen (DE); Hidetoshi Suzuki, Kanagawa (JP); Ming-Hung Tao, Frankfurt am Main (DE); Ankit Bhamri, Rödermark (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 14 days.

(21) Appl. No.: 17/096,196

(22) Filed: Nov. 12, 2020

(65) Prior Publication Data

US 2021/0068135 A1    Mar. 4, 2021

Related U.S. Application Data

(63) Continuation of application No. PCT/EP2019/073975, filed on Sep. 9, 2019.

(30) Foreign Application Priority Data

Sep. 27, 2018 (EP) .................................. 18197352

(51) Int. Cl.
*H04W 72/20* (2023.01)
*H04W 72/121* (2023.01)

(52) U.S. Cl.
CPC ......... *H04W 72/20* (2023.01); *H04W 72/121* (2013.01)

(58) Field of Classification Search
CPC ........................ H04W 72/121; H04W 72/1278
See application file for complete search history.

(56) References Cited

U.S. PATENT DOCUMENTS

2016/0007374 A1\* 1/2016 Lee ........................ H04L 1/1864
370/336
2017/0093620 A1   3/2017 Um et al.
(Continued)

FOREIGN PATENT DOCUMENTS

EP      3 319 384 A1    5/2018
JP      2018509103 A    3/2018
(Continued)

OTHER PUBLICATIONS

3GPP TR 36.889 V13.0.0, "$3^{rd}$ Generation Partnership Project; Technical Specification Group Radio Access Network; Study on Licensed-Assisted Access to Unlicensed Spectrum; (Release 13)," Jun. 2015, 87 pages.

(Continued)

*Primary Examiner* — Kevin M Cunningham
(74) *Attorney, Agent, or Firm* — Seed IP Law Group LLP

(57) ABSTRACT

The present disclosure relates to a user equipment (UE) which receives, from a base station via an unlicensed radio cell, uplink configuration information to configure at least one set of radio resources of the unlicensed radio cell available for transmitting uplink control information, the radio resource set being associated with a UE group ID indicating a UE group to which the UE is associated. The UE receives, from the base station, downlink control information, DCI, indicating a UE group ID. The UE, when determining that the associated UE group ID is the same as the UE group ID indicated by the DCI, determines scheduling request radio resources within the at least one set of uplink control information radio resources based on the received downlink control information. The UE transmits a schedul- (Continued)

ing request to the base station using the determined scheduling request radio resources.

12 Claims, 6 Drawing Sheets

(56) References Cited

U.S. PATENT DOCUMENTS

| | | | |
|---|---|---|---|
| 2017/0245302 | A1 | 8/2017 | Mukherjee et al. |
| 2018/0123859 | A1 | 5/2018 | Liu et al. |
| 2020/0037169 | A1* | 1/2020 | Chendamarai Kannan ................ H04W 72/14 |
| 2021/0105789 | A1* | 4/2021 | Freda ...................... H04W 4/40 |
| 2021/0368541 | A1* | 11/2021 | Hedayat ............ H04W 74/0816 |

FOREIGN PATENT DOCUMENTS

| | | |
|---|---|---|
| WO | 2018030300 | 2/2018 |
| WO | 2018133754 | 7/2018 |
| WO | 2018143388 | 8/2018 |

OTHER PUBLICATIONS

3GPP TR 38.801 V14.0.0, "$3^{rd}$ Generation Partnership Project; Technical Specification Group Radio Access Network; Study on new radio access technology; Radio access architecture and interfaces (Release 14)," Mar. 2017, 91 pages.
3GPP TR 38.804 V14.0.0, "$3^{rd}$ Generation Partnership Project; Technical Specification Group Radio Access Network; Study on New Radio Access Technology; Radio Interface Protocol Aspects (Release 14)," Mar. 2017, 57 pages.
3GPP TR 38.913 V15.0.0, "$3^{rd}$ Generation Partnership Project; Technical Specification Group Radio Access Network; Study on Scenarios and Requirements for Next Generation Access Technologies (Release 15)," Jun. 2018, 39 pages.
3GPP TS 36.331 V15.1.0, "$3^{rd}$ Generation Partnership Project; Technical Specification Group Radio Access Network; Evolved Universal Terrestrial Radio Access (E-UTRA); Radio Resource Control (RRC); Protocol specification (Release 15)," Mar. 2018, 786 pages.
3GPP TS 38.211 V15.2.0, "$3^{rd}$ Generation Partnership Project; Technical Specification Group Radio Access Network; NR; Physical channels and modulation (Release 15)," Jun. 2018, 96 pages.
3GPP TS 38.212 V15.2.0, "$3^{rd}$ Generation Partnership Project; Technical Specification Group Radio Access Network; NR; Multiplexing and channel coding (Release 15)," Jun. 2018, 98 pages.
3GPP TS 38.213 V15.2.0, "$3^{rd}$ Generation Partnership Project; Technical Specification Group Radio Access Network; NR; Physical layer procedures for control (Release 15)," Jun. 2018, 99 pages.
3GPP TS 38.300 V15.2.0, "$3^{rd}$ Generation Partnership Project; Technical Specification Group Radio Access Network; NR; NR and NG-RAN Overall Description; Stage 2 (Release 15)," Jun. 2018, 87 pages.
3GPP TS 38.321 V15.2.0, "$3^{rd}$ Generation Partnership Project; Technical Specification Group Radio Access Network; NR; Medium Access Control (MAC) protocol specification (Release 15)," Jun. 2018, 73 pages.
3GPP TS 38.321 V15.3.0, "$3^{rd}$ Generation Partnership Project; Technical Specification Group Radio Access Network; NR; Medium Access Control (MAC) protocol specification (Release 15)," Sep. 2018, 76 pages.
3GPP TS 38.331 V15.2.1, "$3^{rd}$ Generation Partnership Project; Technical Specification Group Radio Access Network; NR; Radio Resource Control (RRC) protocol specification (Release 15)," Jun. 2018, 303 pages.
ETSI, "Broadband Radio Access Networks (BRAN); 5 GHz high performance RLAN; Harmonized EN covering the essential requirements of article 3.2 of the R&TTE Directive," ETSI EN 301 893 V1.8.1, Mar. 2015, 93 pages.
Extended European Search Report, dated Mar. 6, 2019, for European Application No. 18197352.0, 12 pages.
International Search Report, dated Oct. 14, 2019, for International Application No. PCT/EP2019/073975, 3 pages.
Vivo, "Discussion on physical layer channel design in NR unlicensed spectrum," R1-1803856, Agenda Item: 7.6.3, 3GPP TSG RAN WG1 Meeting #92bis, Sanya, China, Apr. 16-20, 2018, 4 pages.
Office Action, dispatched Apr. 11, 2023, for Japanese Patent Application No. 2021-504278, (18 pages) (with English Translation).

* cited by examiner

| PUCCH Resource Set index 0 | PUCCH Resource Set index 0 | PUCCH Resource Set index 0 |
|---|---|---|
| PUCCH Resource Set index 1 | PUCCH Resource Set index 1 | PUCCH Resource Set index 1 |
| PUCCH Resource Set index 2 | PUCCH Resource Set index 2 | PUCCH Resource Set index 2 |
| PUCCH Resource Set index 3 | PUCCH Resource Set index 3 | PUCCH Resource Set index 3 |
| PUSCH region | PUSCH region | PUSCH region |
| PUCCH Resource Set index 3 | PUCCH Resource Set index 3 | PUCCH Resource Set index 3 |
| PUCCH Resource Set index 2 | PUCCH Resource Set index 2 | PUCCH Resource Set index 2 |
| PUCCH Resource Set index 1 | PUCCH Resource Set index 1 | PUCCH Resource Set index 1 |
| PUCCH Resource Set index 0 | PUCCH Resource Set index 0 | PUCCH Resource Set index 0 |

Fig. 10

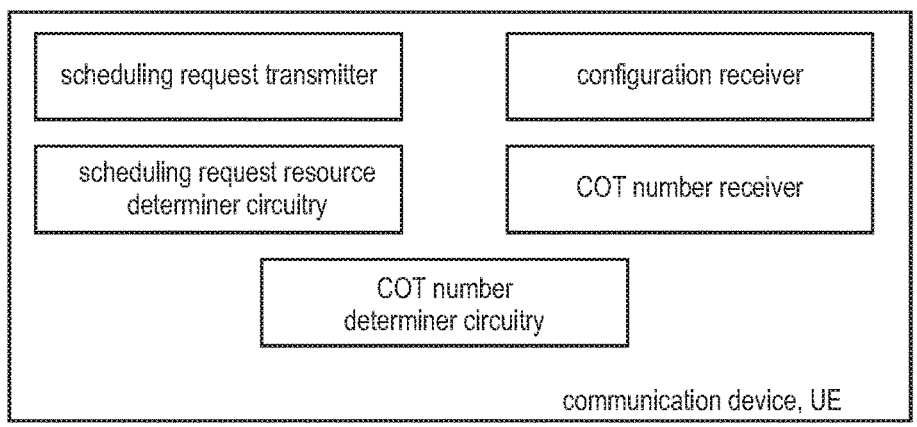

Fig. 11

USER EQUIPMENT AND BASE STATION INVOLVED IN TRANSMISSION OF UPLINK CONTROL DATA

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0 incorporated herein by reference), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

Non-limiting and exemplary embodiments facilitate providing improved procedures to transmit uplink control data, such as a scheduling request, in the unlicensed spectrum.

In one general first example, the techniques disclosed here feature a user equipment comprising a receiver, a transmitter and processing circuitry. The receiver receives, from a base station communicating with the user equipment via an unlicensed radio cell, uplink configuration information to configure at least one set of radio resources of the unlicensed radio cell, the at least one set of radio resources available to the user equipment for transmitting uplink control information, wherein the at least one set of radio resources is associated with a UE group ID indicating a group of user equipment to which the user equipment is associated. The receiver also receives, from the base station, downlink control information, DCI, indicating a UE group ID. The processing circuitry determines whether the UE group ID to which the user equipment is associated is the same as the UE group ID received with the downlink control information. The processing circuitry, when it determines that the UE group ID to which the user equipment is associated is the same as the UE group ID indicated by the downlink control information, determines scheduling request radio resources within the at least one set of uplink control information radio resources based on the received downlink control information. The transmitter transmits a scheduling request to the base station using the determined scheduling request radio resources.

In one general first example, the techniques disclosed here feature a method comprising the following steps performed by a user equipment. The UE receives, from a base station communicating with the user equipment via an unlicensed radio cell, uplink configuration information to configure at least one set of radio resources of the unlicensed radio cell, the at least one set of radio resources available to the user equipment for transmitting uplink control information, wherein the at least one set of radio resources is associated with a UE group ID indicating a group of user equipment to which the user equipment is associated. The UE receives, from the base station, downlink control information, DCI, indicating a UE group ID. The UE determines whether the UE group ID to which the user equipment is associated is the same as the UE group ID received with the downlink control information. The UE, when determining that the UE group ID to which the user equipment is associated is the same as the UE group ID indicated by the downlink control information, determines scheduling request radio resources within the at least one set of uplink control information radio resources based on the received downlink control information. The UE transmits a scheduling request to the base station using the determined scheduling request radio resources.

In one general first example, the techniques disclosed here feature a base station comprising a transmitter and processing circuitry. The transmitter transmits, to one or more user equipment, uplink configuration information to configure at least one set of radio resources of an unlicensed radio cell, the at least one set of radio resources available to the user equipments for transmitting uplink control information in the unlicensed radio cell, wherein the at least one set of radio resources is associated with a UE group ID indicating a group of user equipment to which the user equipment is associated. The processing circuitry performs a clear channel assessment of the unlicensed radio cell. In case the clear channel assessment of the unlicensed radio cell is successful, the processing circuitry determines one of the plurality of UE groups and the associated UE group ID. The transmitter transmits downlink control information to the one or more user equipment, indicating the determined UE group ID.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 10 illustrates the frequency time resource grid, and an exemplary configuration of PUCCH resource sets, according to an exemplary implementation, FIG. 11 illustrates a structure of the UE according to an exemplary implementation.

DETAILED DESCRIPTION

5G NR System Architecture and Protocol Stacks

As presented in the background section, 3GPP is working at the next release for the 5$^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0, incorporated herein in its entirety by reference.

Figure 1:
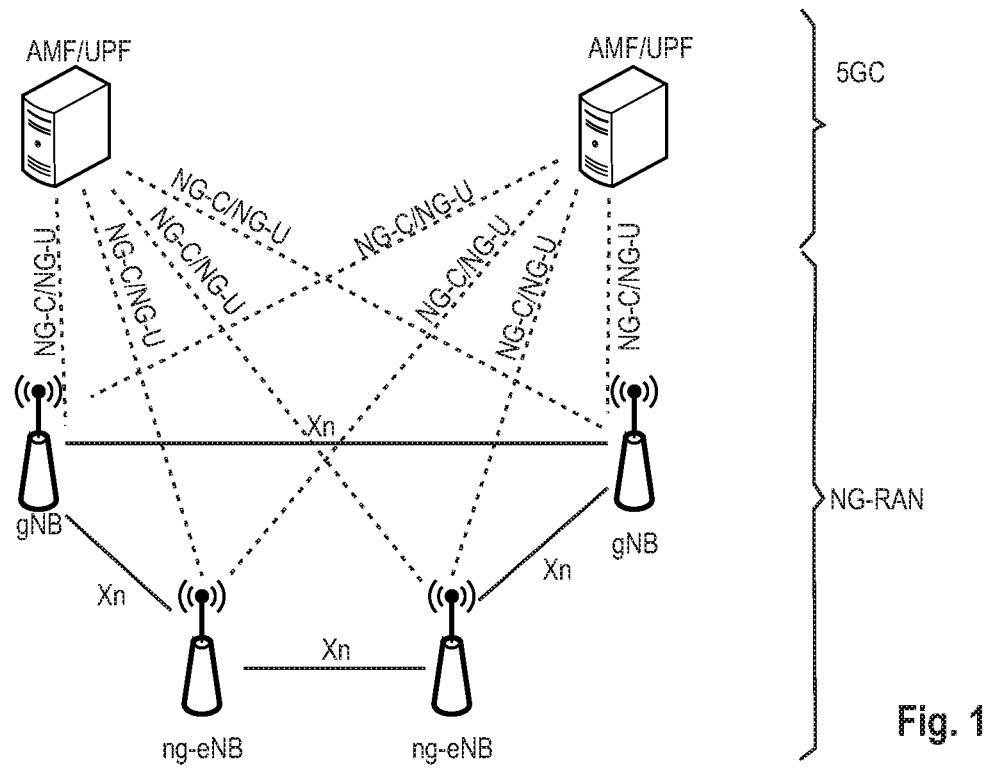
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.2.0, section 4 incorporated herein by reference).

Figure 2:
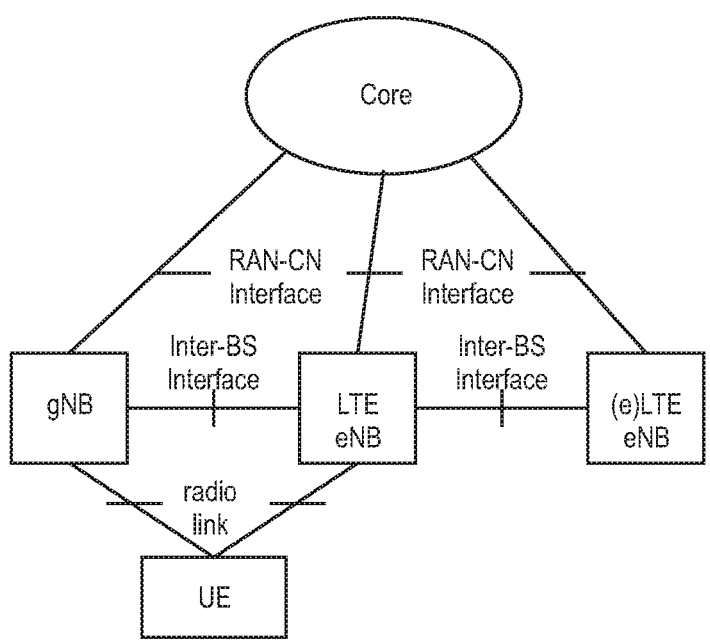
FIG. 2 shows an exemplary user and control plane architecture for the LTE eNB, gNB, and UE.

Various different deployment scenarios can be supported (see, e.g., 3GPP TR 38.801 v14.0.0 incorporated herein by reference). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300 v15.2.0, section 4.4.1 incorporated herein by reference) comprises the PDCP (Packet Data Convergence Protocol), RLC (Radio Link Control) and MAC (Medium Access Control) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300 version 15.2.0 incorporated herein by reference). For more information on the control plane protocol stack for NR, see for instance TS 38.300, section 4.4.2. An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300. The mentioned sections of TS 38.300 are incorporated herein by reference.

The new NR layers exemplarily assumed for the 5G systems may be based on the user plane layer structure currently used in LTE(-A) communication systems.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain. Some definitions have already been achieved as apparent from 3GPP TS 38.211 v15.2.0 incorporated herein by reference.
Control Signaling/PDCCH/DCI/Search Spaces The main purpose of DCI (Downlink Control Information) in 5G NR is the same as DCI in LTE, namely being a special set of information that schedules a downlink data channel (e.g., the PDSCH) or an uplink data channel (e.g., PUSCH). In 5G NR there are a number of different DCI Formats defined (see, e.g., TS 38.212 v15.2.0 section 7.3.1 incorporated herein by reference). An overview is given by the following table.

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

PDCCH search spaces are areas in the downlink resource grid (time-frequency resources) where a PDCCH (DCI) may be carried. Put broadly, a radio resource region is used by a base station to transmit control information in the downlink to one or more UEs. The UE performs blind decoding throughout search space trying to find PDCCH data (DCI). Conceptually, the Search Space concept in 5G NR is similar to LTE Search Space, but there are many differences in terms of the details.

In order for the UE to decode a PDCCH (DCI), it figures out, e.g., the exact value for location (CCE index), structure (Aggregation Level, Interleaving, etc.) and scrambling code (RNTI), etc. But this information is typically not informed to UE beforehand, and in most case those values change dynamically. The only thing known to UE is the information about one or more certain resource regions (search spaces) that possibly carry a PDCCH (DCI). UE knows about these resource regions by a predefined rule or signaling message. Within these search spaces, the UE has to try to decode PDCCH/DCI using many different types of parameters (CCE Index, Aggregation Level, RNTI) based on trial and error method, which is called "Blind Decoding". The predefined region in which UEs perform the blind decoding is called in the technical field a "Search Space".

There are two types of search spaces called "UE-specific search space" and "Common Search Space". UE-specific Search Space (may also be called for instance dedicated search space) is informed to the UE, e.g., via RRC signaling message. As a result, the dedicated search space is monitored by that UE but not other UEs in the radio cell. Correspondingly, the UE performs the RRC establishment and gets the information about the UE-specific search space.

However, in order to facilitate for the UE to decode some PDCCH even before UE completes RRC establishment, for example, the UE may detect PDCCH for SIB1 reception or various DCI (PDCCH) during RACH process (e.g., DCI for Msg2/Msg4 reception). For this kind of situation and others, the network (gNB) transmits a PDCCH in special radio resource regions that UE can figure out by, e.g., a predefined algorithm (not via RRC signaling). This special resource region is, e.g., called Common Search Space and thus can be acquired by any and all UEs.

The UE procedure for receiving control information using the search spaces and PDCCHs is described in TS 38.213 v15.2.0. There are different search space types and the corresponding use of different identifier for different paths the, as exemplarily listed in the following table.

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI, TC-RNTI, C-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, CS-RNTI(s), SP-CSI-RNTI | |
| | UE Specific | C-RNTI, or CS-RNTI(s), or SP-CSI-RNTI | User specific PDSCH decoding |

An RNTI, which stands for Radio Network Temporary Identifier, is an identification number and relies basically on the same concept as already known from LTE. As apparent from the above table, there are numerous different RNTIs that can be used in the 5G-NR communication system for different purposes. Different DCIs (i.e., DCIs of different formats) are typically scrambled (more specifically the CRC part of the DCI; Cyclic Redundancy Check, CRC, part to be understood as an error correction code) with different RNTIs. For instance, the P-RNTI (Paging RNTI) is used for the paging message. The SI-RNTI (System Information RNTI) is used for the transmission of SIB (System Information Block messages). The SFI-RNTI (Slot-Format-Indicator-RNTI) is used in combination with the DCI Format 2_0 to inform the UE on whether the OFDM symbols in the slots are Downlink, Uplink or Flexible. The INT-RNTI (Interrupted Transmission Indication-RNTI) is used in combination with the DCI Format 2_1 to inform UEs on PRBs or OFDM symbols where the UE may assume that no transmission is intended for the UE. The C-RNTI (Cell RNTI) is typically used for transmission to a specific UE. The CS-RNTI (Configured Scheduling RNTI) is used in 5G as part of a configured scheduling resource allocation, which enables the RRC to define the periodicity of the CS grant using the CS-RNTI, so that the resource can be implicitly reused according to the periodicity defined by RRC. The following table gives an overview of different identifier that can be used in the communication between the UE and the gNB (see 3GPP TS 38.321 v15.2.0, incorporated herein by reference).

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |

-continued

| RNTI | Usage | Transport Channel | Logical Channel |
|---|---|---|---|
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| CS-RNTI | Configured scheduled unicast transmission (activation, reactivation and retransmission) | DL-SCH, UL-SCH | DCCH, DTCH |
| CS-RNTI | Configured scheduled unicast transmission (deactivation) | N/A | N/A |
| TPC-PUCCH-RNTI | PUCCH power control | N/A | N/A |
| TPC-PUSCH-RNTI | PUSCH power control | N/A | N/A |
| TPC-SRS-RNTI | SRS trigger and power control | N/A | N/A |
| INT-RNTI | Indication pre-emption in DL | N/A | N/A |
| SFI-RNTI | Slot Format Indication on the given cell | N/A | N/A |
| SP-CSI-RNTI | Activation of Semi-persistent CSI reporting on PUSCH | N/A | N/A |

Synchronization Signal Block Measurement Timing Configuration—SMTC-PSS/SSS, PBCH NR has introduced the so-called synchronization signal block, SS block (SSB), which comprises a Primary Synchronization Signal (PSS), a Secondary Synchronization Signal (SSS), and a Physical Broadcast CHannel (PBCH). The PSS and SSS can be used by UEs to find, synchronize to and identify a network. The PBCH carries a minimum amount of system information including an indication where the remaining broadcast system information is transmitted.

In LTE, these three signals were also used, the PSS, SSS, and PBCH, although not as being part of one SSB. The three SSB components are always transmitted together in NR, e.g., they have the same periodicity. A given SSB may be repeated within an SS burst set, which can be potentially used for a gNB beam-sweeping transmission. The SS burst set may be confined to a particular time period, such as a 5 ms window. For initial cell selection, the UE may assume a default SS burst set periodicity of 20 ms.

The 5G NR PSS is Physical Layer specific signal to identify the radio frame boundary and is type of an m-sequence. In particular, the NR-PSS is an m-Sequence of 127 values, and mapped to 127 active subcarriers around the lower end of the system bandwidth (see, e.g., TS 38.211 v15.2.0 section 7.4.2 incorporated herein by reference). The 5_g NR is also a Physical-Layer specific signal to identify the subframe boundary and is also an m-sequence. In particular, the NR-SSS is a m-sequence of 127 values and mapped to 127 active sub carriers around the lower end of the system bandwidth (see, e.g., TS 38.211 v15.2.0 section 7.4.2 incorporated herein by reference).

Uplink Control Information in 5G NR

Whereas Downlink Control Information is carried by the PDCCH (see above explanation), Uplink Control Information (UCI) can be transmitted on the PUCCH or the PUSCH depending on the situation. Uplink control information can be the channel state information (CSI), the ACK/NACK information and scheduling requests. Not all of these need be carried by a single PUCCH transmission. For instance, the CSI may be carried alone, or the ACK/NACK may be carried alone, or the SR may be carried alone, or the CSI and ACK/NACK are transmitted together in a PUCCH, etc.

There are a plurality of different PUCCH formats that can be used for transmitting the UCI, presently there are five PUCCH formats, 0-4. Two of the formats, 0 and 2, are sometimes referred to as short PUCCH formats, because they occupy at most 2 OFDM symbols. In many cases the last one or 2 OFDM symbols in a slot are used for PUCCH transmission, for example, to transmit a hybrid ARQ acknowledgment (ACK/NACK) for the downlink data transmission.

Three of the formats, 1, 3, and 4, are sometimes referred to as long PUCCH formats because they occupy from 4 to 14 OFDM symbols. The reason for having a longer time duration than the previous two formats is coverage. If a duration of one or two OFDM symbols does not provide sufficient received energy for a reliable reception, a longer time duration is necessary and one of the long PUCCH formats can be used.

Which PUCCH format is used can be, e.g., determined based on how many bits of UCI should be transmitted and how many symbols (duration of the PUCCH) can be used, as exemplary illustrated in the following table (see, e.g., 3GPP TS 38.211 v 15.2.0, section 6.3.2 incorporated herein by reference).

| PUCCH format | Length in OFDM symbols $N_{symb}^{PUCCH}$ | Number of bits |
|---|---|---|
| 0 | 1-2 | ≤2 |
| 1 | 4-14 | ≤2 |
| 2 | 1-2 | ≤2 |
| 3 | 4-14 | ≤2 |
| 4 | 4-14 | ≤2 |

According to a specific and exemplary implementation, the short PUCCH format 0 of up to two UCI bits is based on sequence selection, while the short PUCCH format 2 of more than two UCI bits frequency multiplexes UCI and DMRS. The long PUCCH formats time-multiplex the UCI and DMRS. Frequency hopping is supported for long PUCCH formats and for short PUCCH formats of duration of 2 symbols. Long PUCCH formats can be repeated over multiple slots. (See, e.g., 3GPP TS 38.300 v 15.2.0 section 5.3.3 incorporated herein by reference).

The UCI can be transmitted on the PUCCH flexibly in the time and frequency domain using specifically assigned radio resources, e.g., PUCCH resource sets. A UE can be configured with up to four sets of PUCCH resources, wherein a PUCCH resource set is associated with a PUCCH resource set index. In particular, a PUCCH resource set contains at least four PUCCH resource configurations, where each resource configuration contains the PUCCH format to use and all the transmission parameters necessary for that format. The configuration of such resources can be done by different information elements, e.g., of the RRC protocol layer, such as the PUCCH-Config information element (see, e.g., 3GPP TS 38.331 v15.2.1, such as section 6.3.2, incorporated herein by reference).

As mentioned, up to four PUCCH resource sets can be configured for a UE, each of them corresponding to a certain range of UCI feedback to transmit. For instance, PUCCH resource set 0 can handle UCI payloads up to two bits and hence only contains PUCCH formats 0 and 1, while the remaining PUCCH resource sets may contain any PUCCH format except format 0 and 1.

The current reporting of the UCI in the PUCCH is defined in 3GPP TS 38.213 v15.2.0, section 9.2, incorporated herein by reference.

A PUCCH resource may include one or more of the following parameters.

A PUCCH resource index
An index of the first PRB (Physical Resource Block) prior to frequency hopping and for no frequency hopping
An index of the first PRB after frequency hopping
An indication for intra-slot frequency hopping
A configuration for a PUCCH format The PUCCH resources are assigned by the gNB such that they different for each UE. UEs use the preconfigured PUCCH resources without any coordination of the gNB by assigning different PUCCH resources to the UE it is ensured that UEs may use these resources at the same time without causing collisions or interference with one another.

The transmission of a scheduling request using the PUCCH is defined in 3GPP TS 38.213 v15.2.0, section 9.2.4, incorporated herein by reference. A UE is configured with specific parameters for determining the scheduling request radio resources to be used for transmitting a scheduling request (SR). For instance, periodicity and offset are defined for the SR transmission and are used to determine the slot and/or the frame number for the SR transmission occasion based on the configured PUCCH resource set(s).

In said respect, the configuration of such SR resources can be done by different information elements, e.g., of the RRC protocol layer, such as the SchedulingRequestConfig information element and the SchedulingRequestResourceConfig information element (see, e.g., 3GPP TS 38.331 v15.2.1, such as section 6.3.2, incorporated herein by reference).

NR-Unlicensed

The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum such as Wi-Fi. LTE operation on unlicensed bands was therefore at least in the beginning considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum, i.e., without being assisted by licensed cells, however shall not be excluded, and such a stand-alone unlicensed operation is now foreseen for 5G NR.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

Usage of the unlicensed bands has also become a focus for the new 5G-NR development. The NR licensed design can be used as the baseline, and more deployment scenarios such as the following can be considered:

Carrier aggregation between the NR licensed cell (e.g., PCell) and NR unlicensed cell (e.g., SCell) similar to LTE LAA Dual Connectivity (with LTE and with NR); ENU-DC in which the master eNB operates in licensed spectrum and secondary gNB operates in unlicensed spectrum; NNU-DC in which the master NB operates in licensed spectrum and the secondary gNB operates in unlicensed spectrum Stand-Alone (SA): NR-U SA, in which a standalone NR PCell operates in the unlicensed spectrum An NR radio cell with Downlink in unlicensed band and UL in licensed band In NR, Listen-Before-Talk, is to be performed on unlicensed carriers. In particular, transmitting entities perform LBT, and channel occupation is only allowed after a successful Clear Channel Assessment (CCA).

Figure 3:
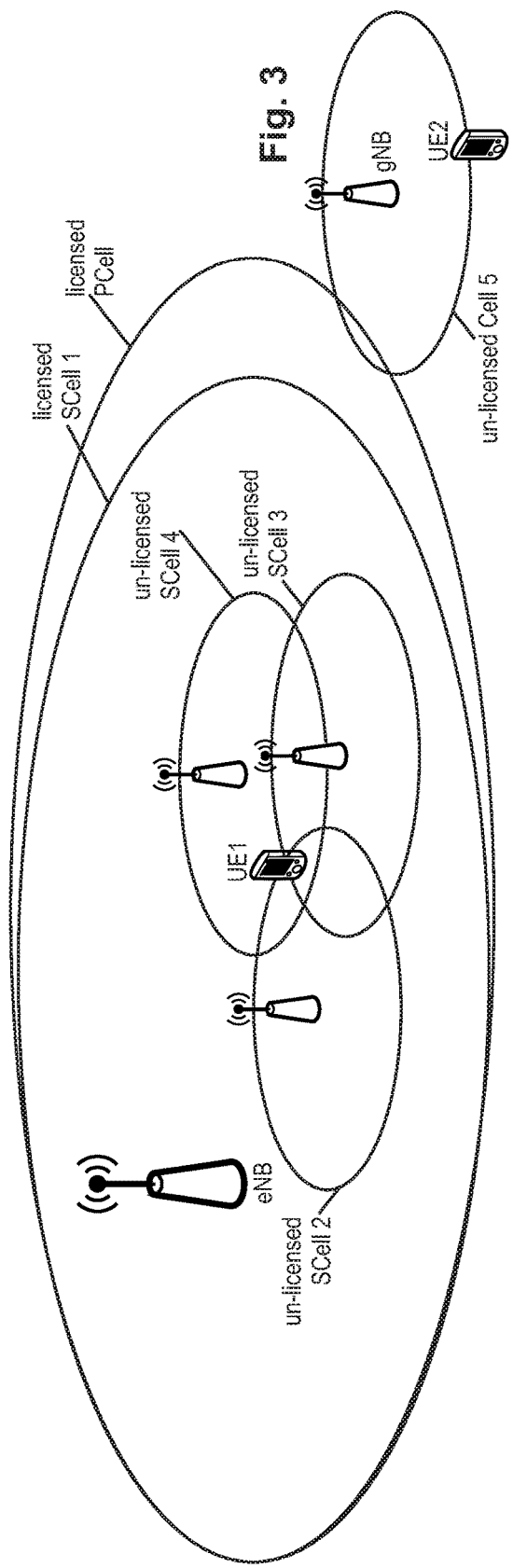
FIG. 3 illustrates an exemplary LAA scenario with several licensed and unlicensed cells.

A very simple scenario is illustrated in FIG. 3, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure. Furthermore, unlicensed radio cell 5 illustrates a stand-alone scenario of an NR PCell that operates in the unlicensed spectrum.

One of the most critical issues is the coexistence with Wi-Fi (IEEE 802.11) systems operating at these unlicensed bands. In order to support fair coexistence between LTE, 5G NR and other technologies such as Wi-Fi as well as to guarantee fairness between different operators in the same unlicensed band, the channel access for unlicensed bands has to abide by certain sets of regulatory rules which partly may depend on the geographical region and particular frequency band (see, e.g., 3GPP Technical Report TR 36.889, version 13.0.0). Depending on region and band, regulatory requirements that have to be taken into account when designing LAA and 5G NR procedures comprise Dynamic Frequency Selection (DFS), Transmit Power Control (TPC), Listen Before Talk (LBT) and discontinuous transmission with limited maximum transmission duration (may also be termed channel occupancy time, or channel acquisition time). A single global framework can be targeted which basically means that all requirements for different regions and bands at 5 GHz can be taken into account for the system design.

The listen-before-talk (LBT) procedure is defined as a mechanism by which a device applies a clear channel assessment (CCA) check before using the channel. According to one exemplary implementation, the CCA utilizes at least energy detection to determine the presence or absence of other signals on an unlicensed channel in order to determine if a channel is occupied or clear, respectively. European and Japanese regulations for instance mandate the usage of LBT in the unlicensed bands. Apart from regulatory requirements, this carrier sensing via LBT is one way for fair sharing of the unlicensed spectrum and is thus considered to be a vital feature for fair and friendly operation in the unlicensed spectrum in a single global solution framework.

In the unlicensed spectrum, the channel availability cannot always be guaranteed. In addition, certain regions such as Europe and Japan prohibit continuous transmissions and impose limits on the maximum duration of a transmission burst in the unlicensed spectrum (maximum channel occupancy). Hence, discontinuous transmission with limited maximum transmission duration is a functionality for LAA and 5G NR.

Following this European regulation regarding LBT, devices have to perform a clear channel Assessment (CCA) before occupying the radio channel with a data transmission. In such restricted exemplary scenarios, it is only allowed to initiate a transmission on the unlicensed channel after detecting the channel as free based, e.g., on energy detection. In particular, the equipment has to observe the channel for a certain minimum time (e.g., for Europe 20 µs, see ETSI 301 893, clause 4.8.3) during the CCA. The channel is considered occupied if the detected energy level exceeds a configured CCA threshold (e.g., for Europe, −73 dBm/MHz, see ETSI 301 893, clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The CCA can be performed repeatedly, optionally with a backoff time in between.

The energy detection for the CCA can be performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment has transmissions on a given carrier without re-evaluating the availability of that carrier (i.e., LBT/CCA) is defined as the channel occupancy time (see, e.g., ETSI 301 893, clause 4.8.3.1). The channel occupancy time shall be in the range of 1 ms to 10 ms, where the maximum channel occupancy time could be, e.g., 4 ms as currently defined for Europe. Furthermore, there is a minimum Idle time the UE is not allowed to transmit after a transmission on the unlicensed cell, the minimum Idle time being at least 5% of the channel occupancy time. Towards the end of the Idle Period, the UE can perform a new CCA, and so on.

Moreover, the CCA may not be required within a specific time period after receiving a signal by another entity, e.g., within 16 microseconds, as part of a shared COT. For instance, switching between DL and UL, and between UL and DL, within a shared gNB COT, does not require LBT.

Figure 4:
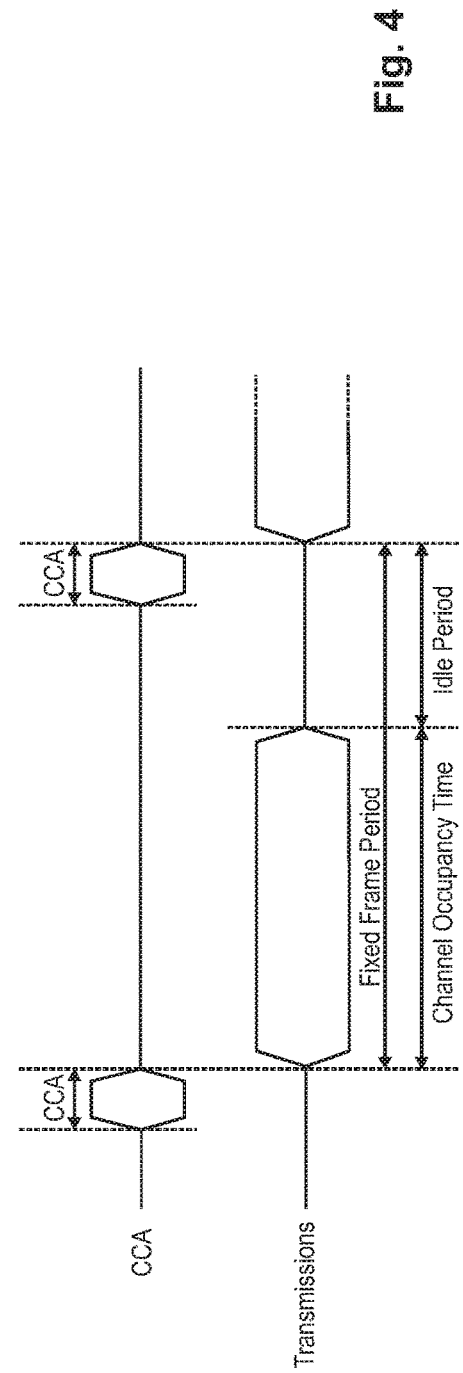
FIG. 4 illustrates the transmission behavior for an LAA transmission.

This transmission behavior is schematically illustrated in FIG. 4 (see, e.g., ETSI EN 301 893).

The above-mentioned stand-alone scenario is especially challenging because the network (gNB) does not have the possibility to rely on a licensed carrier (such as the licensed PCell carrier in LTE) to communicate with the UE. The only channel to the UE is the unlicensed channel for which successful LBT may be one of the requirements to access same.

Consequently, the operation on unlicensed radio cells requires any transmitter to perform Listen-Before-Talk as described above. This is also applied to the transmission of a scheduling request by the user equipment, typically used to request radio resources for a new uplink transmission. For instance, when a regular buffer status report is triggered and available for transmission, but uplink radio resources for transmitting the buffer status report are not available, the UE may request uplink radio resources from the base station by transmitting a scheduling request.

The scheduling request is basically a flag raised by the user equipment to request uplink resources from the uplink scheduler at the base station. Since the device requesting the resources has no PUSCH resource, the scheduling request is transmitted on the PUCCH using the preconfigured and periodically reoccurring PUCCH resources dedicated to the UE. Serving base station can thus assign radio resources to the user equipment.

Unlike LTE, 5G NR supports configuration of multiple scheduling requests from a single device. A logical channel can be mapped to zero or more scheduling request configurations. This provides the gNB not only with information that there is data awaiting for transmission in the device, but also what type of data is awaiting for transmission. This is useful information for the gNB considering the various traffic types 5G NR is designed to support. For example, the gNB may want to schedule a user equipment for transmission of latency-critical information but not for non-latency-critical information.

Each device can be assigned dedicated PUCCH scheduling request resources with a periodicity ranging from every second OFDM symbol to support very latency-critical services up to every 80 ms for low overhead. Only one scheduling request can be transmitted at a given time, i.e., in the case of multiple logical channels having data to transmit, original behavior is to trigger the scheduling request corresponding to the highest-priority logical channel. It can only request in repeated and subsequent resources, up to a configurable limit, until a grant is received from gNB. It is also possible to configure a Prohibit timer, controlling how often a scheduling request can be transmitted. In the case of multiple scheduling request resources, both of these configurations are done as per scheduling request resource.

On the other hand, a device which has not been configured with scheduling request resources may rely on the random access mechanism to request resources. The random access mechanism is a contention-based mechanism for requesting resources, suitable for situation where there is a large number of devices in the cell and the traffic intensity (and thus the scheduling intensity) is low.

The inventors have recognized several problems in connection with how scheduling requests are to be transmitted on unlicensed radio cells. In (e)LAA the scheduling request are not transmitted in the unlicensed spectrum but in the licensed spectrum (e.g., using the Primary Cell). Consequently, the scheduling request procedure is not impacted by the listen before talk requirements imposed when transmitting in the unlicensed spectrum. Conversely, the standalone operation of an unlicensed radio cell or a dual connectivity scenario (such as in NR-unlicensed and possibly also in LTE) supports the transmission of a scheduling request on an unlicensed carrier such that the scheduling request transmission is subject to the listen-before-talk requirements.

As explained before, one currently defined mechanism for transmitting a scheduling request is based on preconfigured PUCCH radio resources, providing a fixed pattern of scheduling request transmission opportunities. However, these SR transmission opportunities may not be usable in case the UE cannot successfully acquire the unlicensed carrier (for instance, the CCA was not successful). The UE would have to wait for the next available scheduling request transmission occasion and again perform a CCA. This may lead to a significant time delay, and further might not be acceptable according to the delay requirements that the UE is trying to support. Moreover, it should be noted that the gNB has no control against the failure of the transmission of the scheduling request due to the unsuccessful LBT.

The inventors have recognized the need for defining efficient mechanisms for transmitting a scheduling request in the unlicensed radio cells.

In the following, UEs, base stations, and procedures to meet these needs will be described for the new radio access technology envisioned for the 5G mobile communication systems, but which may also be used in LTE mobile communication system. Different implementations and variants will be explained as well. The following disclosure was facilitated by the discussions and findings as described above and may for example be based at least on part thereof.

In general, it should be however noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 5:
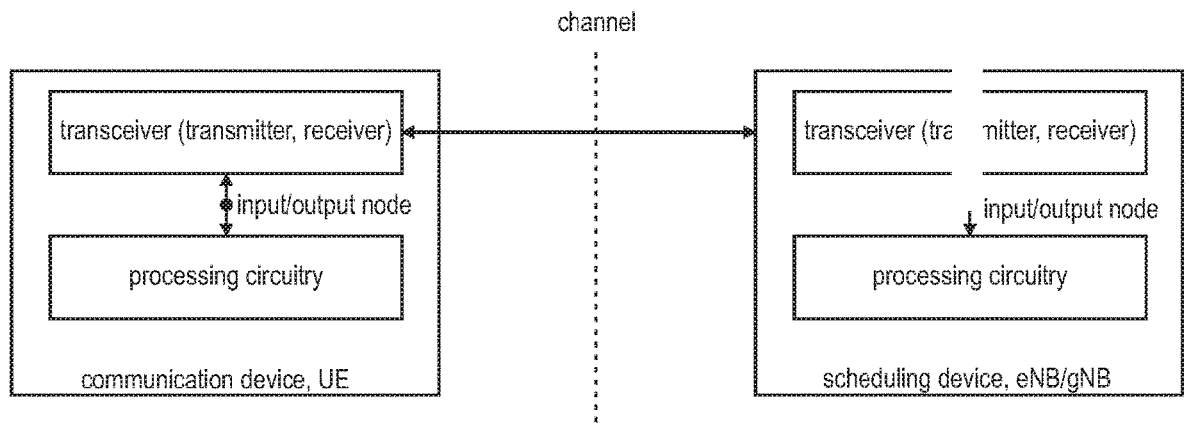
FIG. 5 illustrates the exemplary and simplified structure of a UE and a gNB.

FIG. 5 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

In the present case as will become apparent from the below disclosure of the different embodiments and variants thereof, the processor can thus be exemplarily configured to at least partly perform the step of determining whether two UE group IDs are identical. The processing circuitry can also at least partly perform the step of determining scheduling request radio resources that can be used for transmitting a scheduling request. Still another task that can be performed at least partly by the processing circuitry is descrambling a CRC of the DCI, using one of a plurality of corresponding identifiers.

The transmitter can be configured to at least partly perform the step of transmitting a scheduling request using previously determined radio resources.

The receiver can in turn be configured to be able to at least partly perform the step of receiving uplink configuration information as well as downlink control information.

The solutions offered in the following mainly apply to the new 5G NR standardization for the unlicensed operation (e.g., standalone or dual connectivity), particularly to scenarios according to which the uplink control information including the scheduling request is transmitted on the unlicensed carrier.

A simplified NR-Unlicensed scenario is exemplarily assumed in the following, an example of which is illustrated in FIG. 3, showing an NR-Unlicensed radio cell 5 served by a gNB and a corresponding UE2 being located in the unlicensed radio cell 5. UE 2 is communicating with the gNB of the unlicensed radio cell via the unlicensed spectrum. Although not show in FIG. 3, it can be further assumed that there are other UEs located in the unlicensed radio cell 5 and are communicating with the gNB of the unlicensed radio cell via the unlicensed spectrum too. In the following, various solutions will be presented with regard to the improved transmission of UCI, e.g., a scheduling request, by the UEs in the unlicensed radio cell 5.

Figure 6:
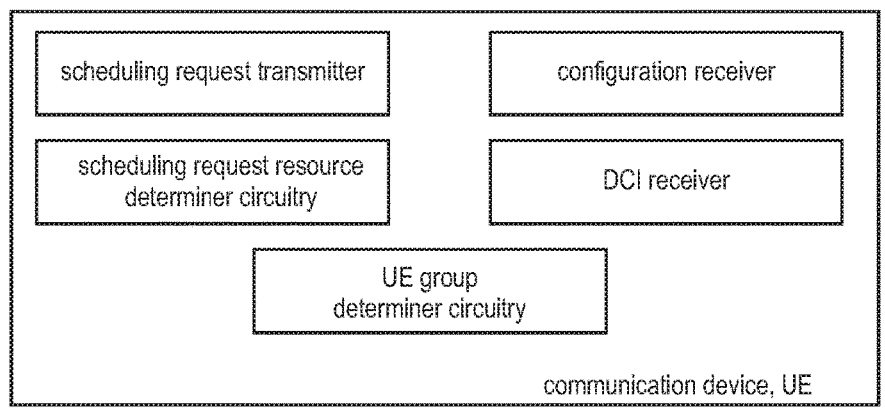
FIG. 6 illustrates a structure of the UE according to an exemplary implementation.

FIG. 6 illustrates a simplified and exemplary UE structure according to the presented solution. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent therefrom, the UE includes a configuration receiver, a DCI receiver, a UE group determiner circuitry, a scheduling request resource determiner circuitry, and a scheduling request transmitter, in order to participate in the improved procedure for transmitting a scheduling request in an unlicensed radio cell as will be explained in the following.

Figure 7:
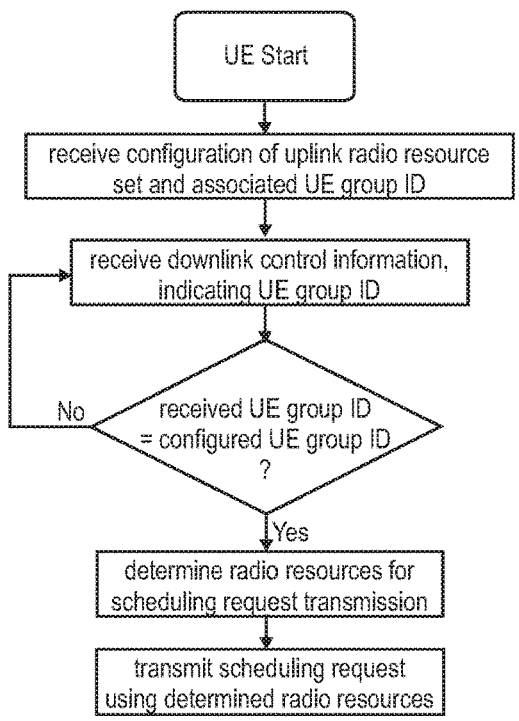
FIG. 7 is a flow diagram for the behavior of a UE, according to an exemplary implementation.
Figure 8:
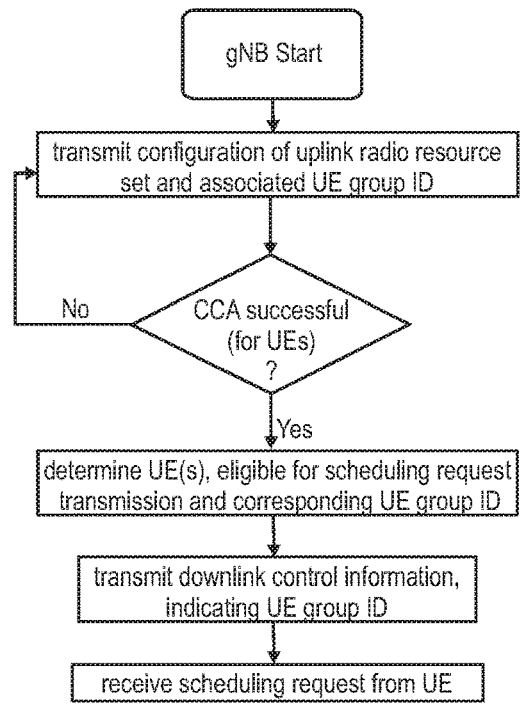
FIG. 8 is a flow diagram for the behavior of a gNB, according to an exemplary implementation.
Figure 9:
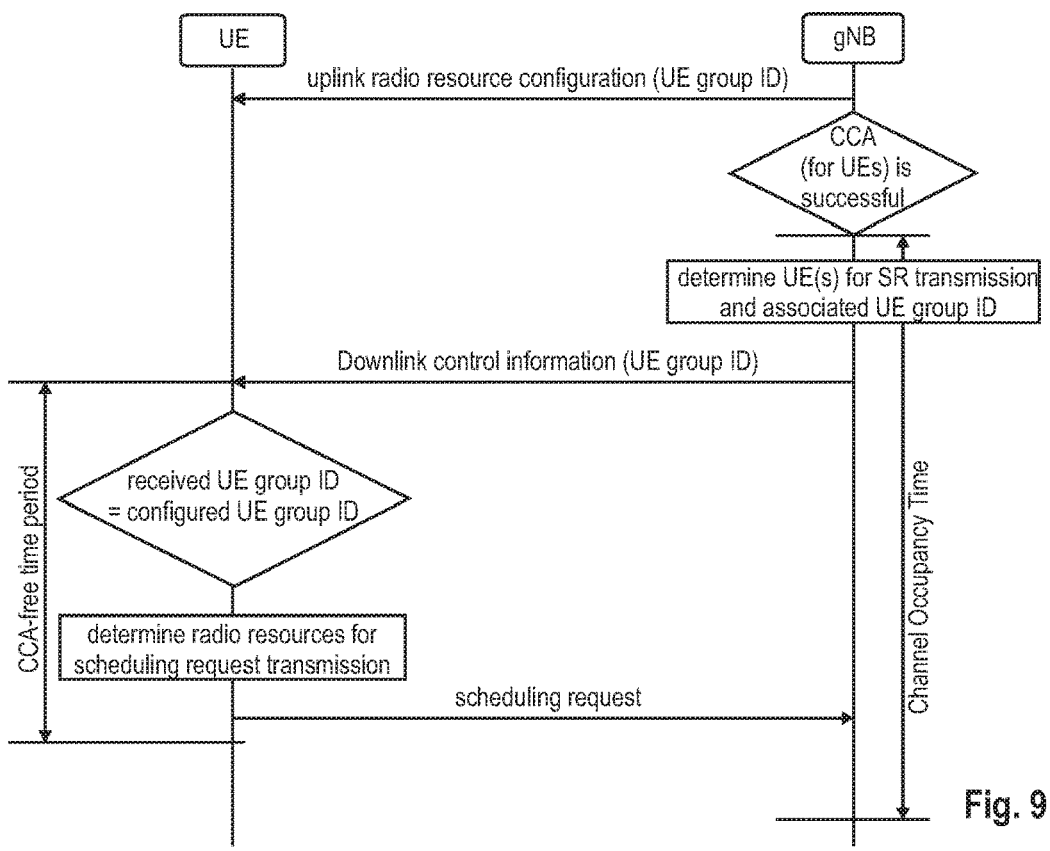
FIG. 9 illustrates the signal exchange between the UE and gNB, according to an exemplary implementation.

One exemplary procedure for the SR transmission will be explained with reference to FIGS. 7, 8 and 9, FIG. 7 illustrating a processing sequence performed at the UE side, FIG. 8 illustrating a processing sequence performed at the gNB side, and FIG. 9 illustrating a signal exchange between the UE and the gNB.

The gNB controls how the available uplink radio resources are distributed into different sets of resources. In the following, according to a simplified and exemplary solution, it is assumed that four different uplink radio resource sets 0-3 are defined by the gNB, respectively referring to different (non-interfering) radio resources. For instance, the uplink radio resources of the different sets can be Frequency Division multiplexed in the frequency domain, or Code Division multiplexed (e.g., using OOC, Orthogonal Cover Codes, or different cyclic shift of the sequence) or Time Division multiplexed (e.g., based on OFDM symbols as the time unit) or any suitable combination of Frequency Division, Code Division CD, and Time Division. In one example, the definition of the radio resources of the sets can be restricted to the frequency domain and/or code domain and symbol length within the one transmission occasion. The transmission occasion in time domain is not specified explicitly for the radio resources of the sets by the configuration of the uplink radio resources, but rather is achieved by the reception of the message (e.g., DCI) received from the gNB indicating the particular UE group (see later explanation). Put differently, the timing of when to perform the transmission of the SR (e.g., symbol, slot, subframe) can be derived from the reception of the DCI.

Moreover, the gNB supports a mechanism of grouping user equipments into different UE groups. In one exemplary variant, the grouping of the UEs within the unlicensed radio cell can be performed by the gNB based on one or more criteria. For example, the gNB may group the UEs based on the data priorities that are supported by the respective UEs. Consequently, in one exemplary implementation one UE group may comprise high-priority UEs, whereas another UE group may comprise low-priority UEs.

According to further examples, the gNB may group the UEs based on capabilities, such as support for eMBB, URLLC, and MMTC communication.

The UE can be part of only one UE group but may also belong to more than one UE group. For instance, when the UE supports more than one usage scenario, such as URLLC and eMBB traffic, the UE could be assigned to an URLLC UE group and to an eMBB UE group.

An exemplary configuration of the uplink radio resource sets and UE groups will be assumed in the following and is illustrated in the subsequent table.

| UE group ID | UE | Uplink radio resource set |
|---|---|---|
| 00 | UE1 | 0 |
| 00 | UE2 | 1 |
| 00 | UE3 | 2 |
| 00 | UE4 | 3 |
| 01 | UE5 | 0 |
| 01 | UE6 | 1 |
| 01 | UE7 | 2 |
| 01 | UE8 | 3 |
| 10 | UE9 | 0 |
| 10 | UE10 | 1 |
| 10 | UE11 | 2 |
| 10 | UE12 | 3 |

As apparent therefrom, it is exemplarily assumed that there are 12 UEs, grouped into three groups (indexed 00, 01, 10), respectively comprising four UEs. Furthermore, the gNB has also provide an association between the UEs in one group and the available different uplink radio resource sets 0-3. For instance, the UEs within a group are associated with respectively different uplink radio resource sets, thereby facilitating that no transmission collisions occur between those UEs of the same group.

In this example, it is assumed that there are only three different UE groups, such that a UE group ID of 2 bits would suffice to distinguish the three groups. It should be noted that in case more UE groups are to be distinguished, the UE group ID would have more bits to be able to distinguish all UE groups.

In the above exemplary scenarios, four different radio resource sets were assumed per UE group. Correspondingly, a UE group may contain up to four different UEs, so as to ensure that each radio resource set is only available to one UE in a UE group. There may be less or more radio resource sets defined by the gNB. Consequently, the maximum number of UEs in a group depends on the number of different uplink radio resource sets and can, e.g., be equal to the number of different radio resource sets that can be assigned by the gNB. This ensures that when the gNB wants to allow UCI transmissions for a specific UE group, there are no collisions between the various UEs of said group when performing the transmissions.

As apparent from the above exemplary table, the same radio resource sets are shared over the various UE groups (e.g., radio resource set 0 is assigned to and shared by UEs 1, 5, and 9 of respective groups 00, 01, and 10). On the other hand, from the perspective of one UE group, the radio resource sets are dedicated to one UE only and are thus are different between the UEs of the respective group.

The UE2 is configured by the gNB with at least one set of uplink radio resources that can be used to transmit uplink control information (such as the scheduling request, the channel state information, or ACK/NACK feedback). Furthermore, the UE is also informed about at least one UE group ID with which the at least one set of uplink resources is associated, e.g., establishing a one-to-one relationship between a set of uplink radio resources and a UE group ID.

The association between the uplink radio resource set and the UE group ID, as defined in the UE can be expressed as follows (see above exemplary assumed configuration of uplink radio resources by the gNB):

| UE group ID | UE | Uplink radio resource set |
|---|---|---|
| 00 | UE1 | 0 |

Consequently, the UE is now configured with uplink radio resources that it can use in the context of transmitting uplink control information, such as the scheduling request.

However, transmissions in unlicensed radio cells may require that the radio channel is first acquired, e.g., by successfully performing a Clear Channel Assessment (CCA), as explained above, e.g., above in the context of LTE and 5G NR scenarios. The exemplary solutions thus provide an additional mechanism to assist the UE in transmitting the uplink control information (such as the scheduling request, or CSI, or ACK/NACK feedback) on the unlicensed carrier complying with this requirement and effectively allowing the UE to not have to perform a (successful) CCA on its own. Rather, the gNB performs the CCA so as to acquire the unlicensed carrier and then allows one or more of the UEs in its unlicensed radio cell to use the acquired unlicensed channel to transmit the uplink information using the previously configured uplink radio resources. Put differently, the gNB shares its Channel Occupancy Time so that UEs may use the unlicensed carrier, which is actually acquired by the gNB, in order to transmit scheduling requests during the Channel Occupancy Time of the gNB. Typical Channel Occupancy Times are within 1 ms and 10 ms, during which the gNB can allow SR transmission occasions to the UEs in its cell.

In said respect, the gNB first tries to acquire the unlicensed carrier of the unlicensed radio cell by performing a CCA (part of the LBT, Listen-Before-Talk). It is assumed that the CCA is successful and the gNB thus may occupy the radio channel, e.g., because the unlicensed spectrum is currently not used by another device (e.g., another UE, or WiFi node). The gNB can now use the channel for a specific time period (the channel occupancy time) as explained above in detail, e.g., there may a maximum time period that the device (here gNB) is allowed to occupy the unlicensed carrier.

The gNB, after acquiring the unlicensed carrier, can now decide which UE (or more than one UEs) should be provided with an uplink transmission occasion, which may be done, e.g., based on various different criteria and in different manners. This determination by the gNB can be based on, e.g., the priority or capabilities of the UE. Or the gNB may sequentially provide an uplink transmission opportunities for all UEs, thereby considering to which UE (or UEs) the gNB previously provided an uplink transmission opportunity. In this respect, it should be further noted that the assignment of uplink transmission opportunities can be performed, e.g., based on the UE grouping mentioned above, such that the gNB may decide to allow the UEs of one UE group to access the unlicensed radio cell. The gNB would thus determine the associated UE group ID and then transmits this UE group ID in its unlicensed radio cell to be received by those UEs of the UE group ID.

For instance, the gNB transmits downlink control information in its radio cell so as to indicate the selected UE group ID, which can be done in various different manners. According to one exemplary implementation, the downlink control information can be transmitted in a common search space of the downlink control channel, e.g., scrambled with one common identifier, such as the SFI-RNTI, INT-RNTI, or SI-RNTI. As a further alternative, a new RNTI can be defined for this purpose, e.g., termed SR-RNTI (Scheduling Request-RNTI), used in the context of sending a DCI to provide SR transmission occasion to the UE(s). The UE group ID could be part of the content of the DCI, e.g., in a specific UE group ID field. An already existing DCI format can be used (such as DCI formats 2_0 or 2_1), where one of the already available fields can be reused to carry the UE group ID. Alternatively, a new DCI format can be defined to said end, e.g., comprising at least the UE group ID field, and possible other fields such as a field for additionally indicating scheduling request radio resources as will be explained in more detail further below.

According to other implementations, the UE group ID is implicitly encoded into the downlink control information, for instance by using the UE group ID for the scrambling process of the DCI. In more detail, the UE group ID is used by the gNB to scramble the CRC part of the DCI. Consequently, the UE, by monitoring the common search space based on its UE group ID, can thus determine that the DCI indicates the UE group ID. The descrambling operation performed by the UE for the received DCI will only be successful when using the correct UE group ID (the one used by the gNB for scrambling the DCI, more specifically the CRC part of same). In order to be able to use of the UE group ID for this scrambling process, the UE group ID may have to be of a specific format, for instance having a specific length, similar to the other RNTI typically used in the scrambling process (see 3GPP TS 38.321 version 15.3.0 and one of the hexa-decimal values FFF0-FFFD, that are currently defined as being reserved). Consequently, in such an exemplary scenario, the above-assumed exemplary UE group ID having 2 bits (00, 01, 10) might not be usable, rather a bit sequence having more bits (as necessary) would be used to distinguish the UE groups.

This may have the advantage that existing DCI formats can be used, albeit scrambled with a different parameter than the usual RNTI, i.e., the UE group ID.

Rather than transmitting a DCI message in the common search space of the downlink control channel, the DCI message can be transmitted in a dedicated search space of the downlink control channel. A dedicated search space in this connection can be understood as being configured for a particular UE and thus only monitored by this particular UE (whereas the common search space is monitored by a plurality or even all UEs in the radio cell). Correspondingly, the DCI is scrambled using a dedicated UE identifier, such as the C-RNTI, of the UE for which the DCI is intended.

In the present scenario, where the gNB decided to allow the UEs of a group to access the unlicensed radio cell, when using a dedicated DCI to carry the UE group ID, it would be also necessary to transmit several dedicated DCI so as to reach all the UEs in the selected UE group.

In any case, the UE thus receives the downlink control information message from the gNB, from which the UE can obtain the UE group ID, selected by the gNB. As discussed above, the UE may receive the DCI either in the common search space or the dedicated search space, depending on how the DCI is transmitted by the gNB. This may involve that the UE monitors the respective search spaces for such a DCI using particular identifiers for the descrambling process depending on the specific implementation. Moreover, which process the UE has to perform in order to obtain the UE group ID from the DCI depends on how the DCI message is actually implemented as discussed above. For instance, the UE group ID may be obtained from the content of the DCI or from the descrambling process performed by the UE for the DCI.

The UE can determine whether the received UE group ID, selected by the gNB, is the same one as the UE group ID with which it was configured before. Put differently, the UE determines whether it belongs to the UE group that the gNB selected for accessing the unlicensed radio cell, e.g., for transmitting a scheduling request, during the gNB's COT.

It is further exemplarily assumed that a scheduling request was indeed triggered at the UE (e.g., by a buffer status report) and is thus available for transmission. Conversely, if no scheduling request is available for transmission, there would be no need for the UE to proceed further to make use of the SR transmission opportunity offered by the gNB, more specifically as informed by the DCI and the indicated UE group ID. In said case, the UE might not even monitor for reception of the DCI, etc.

In case the UE determines that the two UE group IDs are the same, the UE proceeds and determines the radio resources for transmitting the scheduling request. For instance, the determination of the SR radio resources is based on the previously configured uplink radio resources and on the received DCI. Assuming the exemplary scenario above, the UE1 has been configured with the radio resource set with the index 0. The radio resources for transmitting the scheduling request are within the radio resources of that radio resource set 0.

The time domain values for the radio resources are determined based on the reception timing of the DCI.

Subsequently, the UE can transmit the scheduling request to the base station using those determined scheduling request radio resources of the unlicensed radio cell.

Even though the UE performs a transmission on the unlicensed radio cell, the UE does not need to perform a previous clear channel assessment (CCA). The unlicensed radio cell has been acquired already by the gNB, and can thus be used by the UE to transmit the scheduling request. As apparent from FIG. 9 the channel occupancy time (COT) of the gNB ends after the transmission of the scheduling request by the UE.

Moreover, in one exemplary implementation the UE transmits the scheduling request within a brief period of time (exemplary termed CCA-free time period in FIG. 9) after receiving the DCI with the UE group ID. For instance, when the switching gap between the downlink (of the DCI) and the uplink (transmission of SR) is less than a brief period of time (e.g., 16 microseconds), the UE does not need to perform listen-before-talk to acquire the unlicensed spectrum first. In other words, the reception of the DCI provides the UE with a time trigger to immediately perform (within a specific period of time) the scheduling request transmission so as to avoid performing a CCA on its own.

For instance, the UE obtains from the configured PUCCH resource set the frequency resources (e.g., the PRB it may use) and the PUCCH format and the timing from the DCI, thereby having determined the necessary time and frequency resources to transit the scheduling request.

The procedure may continue after the scheduling request is transmitted from the UE to the gNB in a usual manner; e.g., the gNB may process the scheduling request and does or does not allocate further uplink resources to the UE for a new uplink transmission. This is not illustrated in FIG. 9 because it is not the focus of this application.

In the context of providing the UEs in its unlicensed radio cell with scheduling request occasions, the gNB can perform the CCA and transmission of the DCI (with a UE group ID) based on its own decision, e.g., on a regular basis or dynamically deciding whether to assign PUCCH resources according to the current circumstances such as the channel state, congestion, number of UEs in its cell, the amount of UE traffic, the priority of UEs, etc. There may be additional requirements on how often the CCA can be performed as a maximum within a time period, which may also vary from region/country. For instance, the gNB can perform the CCA and DCI transmission, so as to provide SR transmission occasions in every slot or frame.

According to some exemplary implementations, the gNB can decide whether to provide uplink resources in its radio cell, based on measurement information obtained from one or more UEs in its unlicensed radio cell. For instance, the UE may triggered even-V1 and V2-based measurement report when the channel busy ratio is above a threshold.

According to another exemplary implementation, the UE sends a channel occupancy report periodically. The channel occupancy report is mainly based on the reception of signals. If the reception signal is coming from serving gNB, then it is DL. But if it is coming from other system, then it is not DL. Channel occupancy report allows the gNB to evaluate how likely DL traffic is to collide with other system (for example, other hidden node traffic). Based on the channel occupancy report gNB can decided how frequently it has to reserve PUCCH resources. (See TS 36.331 v15.1.0).

According to a further exemplary implementation, the gNB may further dynamically restrict the radio resources that are to be used by the UE(s) to transmit the scheduling request, and thus optionally may also restrict the UEs that may access the unlicensed radio cell to transmit the scheduling request. In more detail, as has been described above, the gNB transmits a message to the UE indicating the selected UE group ID (e.g., using a DCI message). According to this further exemplary implementation, this message (e.g., the DCI) may further indicate radio resources for transmitting the scheduling request. These scheduling request radio resources, indicated in the DCI, can be a subset of the radio resources that are generally available for use.

For instance, assuming that the DCI message indicates the UE group ID 00, thus referring to UEs UE1-UE4 respectively associated with uplink resource sets 0-3 (see above exemplary table). The gNB may decide that only one or more, but not all, of the uplink resource sets 0-3 should be available in the unlicensed radio cell. Correspondingly, the gNB may additionally include suitable information in their DCI to indicate these available scheduling request radio resources when transmitting the DCI message with the UE group ID. Alternatively, the gNB could include suitable information in the DCI indicating the blocked radio resources that are not to be used.

According to one implementation, the gNB may explicitly indicate the usable scheduling request resources, e.g., identifying the PRBs to be used. In another implementation, the gNB may indicate the radio resource sets that are available, e.g., identifying the radio resource set 00 and possibly further radio resource sets. The bits necessary to indicate the PRBs may also depend on the overall available resources, e.g., the bandwidth part.

For example, the gNB determines that there is channel interference for specific radio resources and may dynamically perform this determination to not allow uplink transmissions by the UE(s) on those resources. Another reason to restrict the uplink radio resources is carrier congestion.

For example, the DCI message indicates the UE group ID 00 (thereby restricting the UEs that can transmit in the uplink to UE1-UE4) and may further indicate uplink resource sets 0, 1, and 2 (thereby further restricting the UEs that can transmit in the uplink from UE1-UE4 to UE1-UE3). The scenario is exemplary illustrated using the above-introduced exemplary configuration table:

| UE group ID | UE | Uplink radio resource set |
|---|---|---|
| 00 | UE4 | 0 |
| 00 | UE2 | 1 |
| 00 | UE3 | 2 |
| ~~00~~ | ~~UE4~~ | ~~3~~ |
| ~~01~~ | ~~UE5~~ | ~~0~~ |
| ~~01~~ | ~~UE6~~ | ~~1~~ |
| ~~01~~ | ~~UE7~~ | ~~2~~ |
| ~~01~~ | ~~UE8~~ | ~~3~~ |
| ~~10~~ | ~~UE9~~ | ~~0~~ |
| ~~10~~ | ~~UE10~~ | ~~1~~ |
| ~~10~~ | ~~UE11~~ | ~~2~~ |
| ~~10~~ | ~~UE12~~ | ~~3~~ |

As apparent therefrom, only UE1, UE2, and UE3 will be allowed to transmit a scheduling request in the uplink, respectively using their associated uplink resource sets 0, 1, and 2 By identifying the available SR radio resources, in addition to indicating the UE group ID, the gNB can configure the (frequency) radio resources in a dynamic manner, e.g., depending on the current situation with regards to, e.g., channel state in the unlicensed radio cell, interference, and/or carrier congestion.

From the UE perspective, the UEs respectively additionally perform a determination whether the indicated scheduling request resources are within those radio resources of the set with which they were initially configured. For instance, UE1 indeed confirms that the indicated radio resources (e.g., set index 0) is the same as the configured set index 0, and the UE thus determines that it can transmit the scheduling request that is pending for transmission. On the other hand, UE4 determines that its initially configured resource set 3 is not among the indicated SR resources, and thus determines that it cannot transmit the scheduling request that is pending for transmission. UE4 may have to wait for another SR occasion provided by the gNB possibly in the next COT.

FIG. 10 conceptually illustrates this additional and flexible limitation of the available uplink radio resources, assuming the above scenario. As apparent, FIG. 10 illustrates the time-frequency radio resources generally available in the uplink, and more specifically the radio resources associated with the four uplink radio resource sets 0-4. At the beginning (left had side in FIG. 10), all four resource sets are available for transmitting, e.g., a scheduling request in the uplink. In this case, for example, no additional indication of the scheduling request radio resources in the DCI is necessary.

On the other hand, by additionally indicating scheduling request radio resources in the DCI, the available uplink radio resources can be further limited when needed. In the illustrated example of FIG. 10, in the middle, the uplink radio resource set with index 0 is not available (e.g., by indicating radio resources of only sets 1, 2, 3 or by indicating resource set 0 to be excluded), and on the right-hand side, the uplink radio resource set with index 3 is not available (e.g., by indicating radio resources of only sets 0, 1, 2).

According to further exemplary implementations, the DCI with the UE group ID may not only be transmitted once, but rather repetitions of the initial DCI transmission may be performed within the COT of the gNB. This may facilitate reaching UEs that are in DRX (Discontinued Reception) or are not aligned and thus miss the initial transmission of the DCI. The repetition of the DCI may be done for either the common or dedicated search space. For example, the repetitions may be performed throughout the whole channel occupancy time, or only during a limited period within the COT of time or the number of repetitions may be limited to a maximum number.

In particular implementations, the above-described mechanisms and solutions for improving the uplink transmission of the scheduling request in the unlicensed frequency spectrum can be implemented into the existing and future 5G NR framework. For instance, the configuration of the uplink radio resources can be implemented in a similar fashion as the PUCCH resource sets of 5G NR, and may also be configured using the same or similar information elements of the RRC protocol layer. The usage of the common search space and dedicated search space and related mechanisms (such scrambling with different RNTIs, etc.) known in 5G NR may be reused for transmitting the downlink control information message (with at least UE group) as discussed above.

Figure 12:
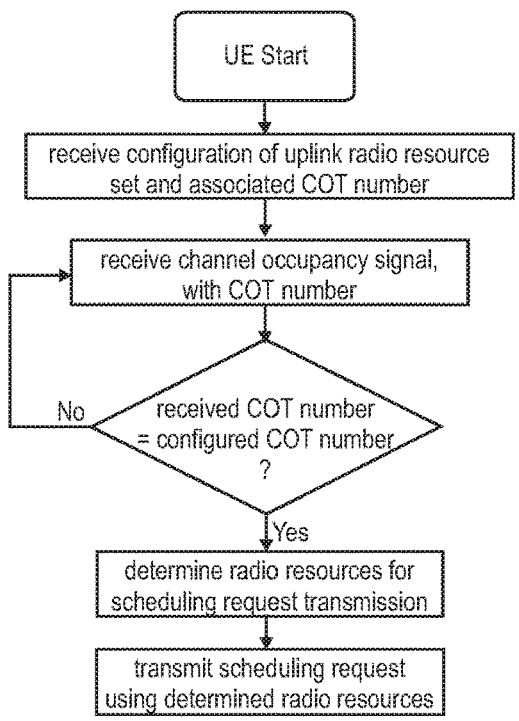
FIG. 12 is a flow diagram for the behavior of a UE, according to an exemplary implementation.
Figure 13:
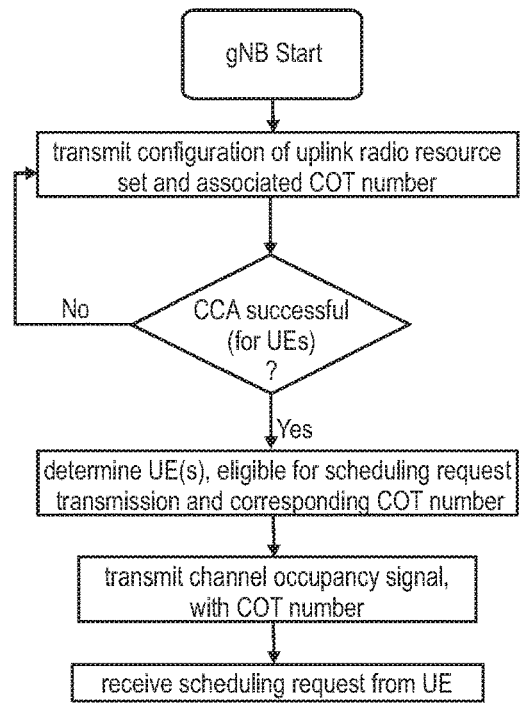
FIG. 13 is a flow diagram for the behavior of a gNB, according to an exemplary implementation.
Figure 14:
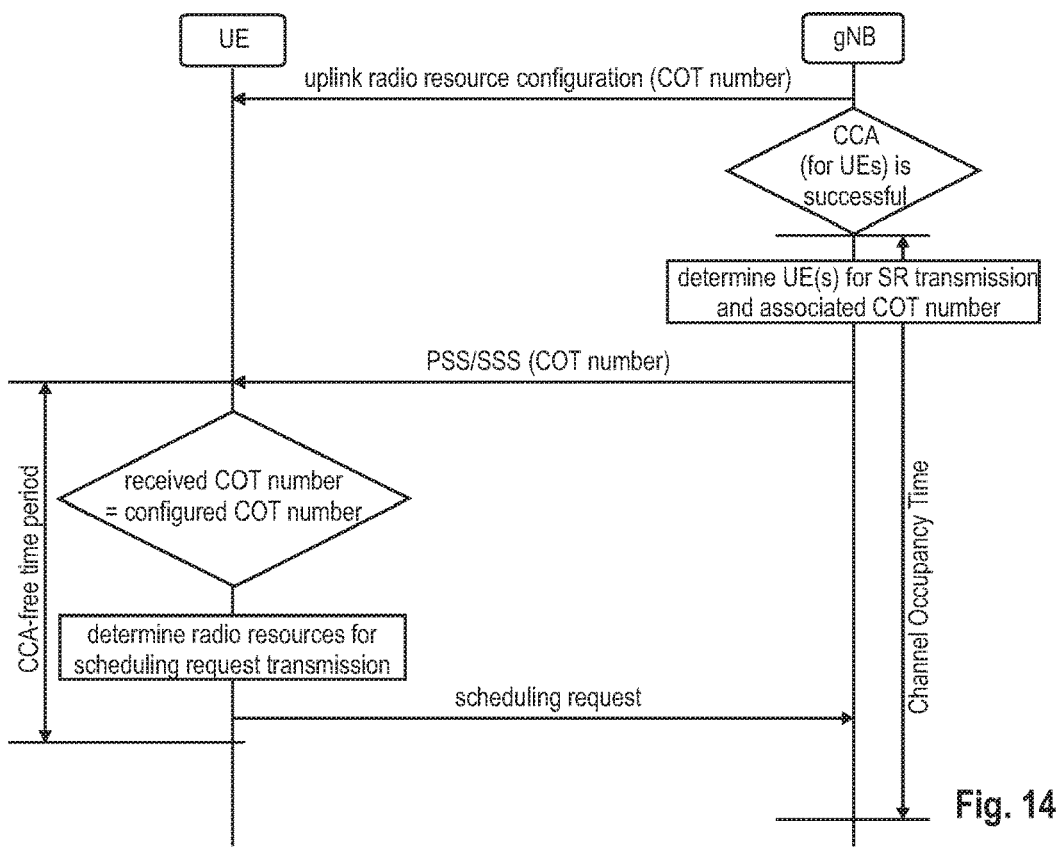
FIG. 14 illustrates the signal exchange between the UE and gNB, according to an exemplary implementation.

In the following, another solution for improving the uplink transmission of the scheduling request in the unlicensed frequency spectrum will be described. This will be explained with reference to FIGS. 11, 12, 13, and 14. FIG. 12 illustrates a processing sequence performed at the UE side, FIG. 13 illustrates a processing sequence performed at the gNB side, and FIG. 14 illustrates a signal exchange between the UE and the gNB according to this solution. Some aspects of this improved solution are similar or the same as for the previously-discussed solution explained with respect to FIG. 6-10.

FIG. 11 illustrates a simplified and exemplary UE structure according to this solution. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent therefrom, the UE includes a configuration receiver, a COT number receiver, a COT number determiner circuitry, a scheduling request resource determiner circuitry, and a scheduling request transmitter, in order to participate in a procedure for transmitting a scheduling request in an unlicensed radio cell as will be explained in the following.

The gNB controls how the available uplink radio resources are distributed into different sets of radio resources. One difference between the following solution and the previous solutions explained in connection with FIG. 6-10, is that in this solution the uplink radio resources are dedicated to one UE rather than shared between several UEs (of a group) as in the solutions explained in connection with FIG. 6-10. Correspondingly, the gNB distributes dedicated uplink radio resources that are different between different UEs to be used for transmitting uplink control information, such as the scheduling request.

For instance, the uplink radio resources of the different sets can be Frequency Division multiplexed in the frequency domain, or Code Division multiplexed (e.g., using OOC, Orthogonal Cover Codes, or different cyclic shift of the sequence) or Time Division multiplexed (e.g., based on OFDM symbols as the time unit) or any suitable combination of Frequency Division, Code Division CD, and Time Division. According to a further exemplary implementation, the definition of the radio resources for the different sets may also include the time domain. The uplink radio resource sets may indicate the symbol, and/or slot and/or frame that can be used in the uplink transmission of the scheduling request. It should be noted however that in this case, this time definition should be applied by the UE with respect to the start of the channel occupancy time acquired by the gNB (shared gNB COT) indicated by the UE as will be explained in the following. For example, the configuration may indicate a periodicity and offset to be used for the SR transmission.

Moreover, the solution is based on the use of a Channel Occupancy Time number (COT number) that facilitates the gNB to control the usage of the uplink radio resources by the UEs in its unlicensed radio cell. In general, the COT number is linked to the channel occupancy of the gNB. In particular, the gNB performs the CCA procedure (of LBT) and occupies the unlicensed carrier. According to one example, the COT number identifies this channel occupancy instance. A different COT number could identify the next channel occupancy instance The radio resource sets are respectively associated with a COT number.

In one example, there can be as many or more COT numbers as radio resource sets so as to unequivocally identify each radio resource set with one COT number.

Alternatively, there could be less COT numbers than radio resource sets, such that one COT number can be associated with one or more radio resource sets. This may have the benefit that uplink transmission occasions can be provided to more than one UE by using just one COT number (see also later explanations). In one exemplary scenario, the association between radio resource sets, UEs and COT numbers can be configured by the gNB in the following manner:

| COT number | UE | Uplink radio resource set |
|---|---|---|
| 1 | UE1 | 0 |
| 1 | UE2 | 1 |
| 1 | UE3 | 2 |
| 2 | UE4 | 3 |
| 2 | UE5 | 4 |
| 2 | UE6 | 5 |
| 3 | UE7 | 6 |
| 3 | UE8 | 7 |
| 3 | UE9 | 8 |
| 4 | UE10 | 9 |
| 4 | UE11 | 10 |
| 4 | UE12 | 11 |

As apparent therefrom, there could be 12 different radio resource sets that are respectively associated to the UEs in a one-to-one fashion. In addition, 4 different COT numbers (e.g., identified by 2 bits) 1-4 could be assigned in the above fashion. Correspondingly, COT number 1 is assigned to UEs 1, 2 and 3, and as well to radio resources sets 0, 1, and 2. And so on.

The above table illustrates only one of many examples of how the gNB can define associations between radio resource sets, UEs and COT numbers.

Moreover, the UE can also be associated with several COT numbers, e.g., in case the gNB wants to prioritize a UE, e.g., based on the latency-requirements that the UE is supposed to fulfill.

The association between radio resource sets, UEs and COT numbers can also be according to the following exemplary implementation:

| COT number | UE | Uplink radio resource set |
|---|---|---|
| 1 | UE1 | 0 |
| 1 | UE2 | 1 |
| 1 | UE3 | 2 |
| 2 | UE4 | 0 |
| 2 | UE5 | 1 |
| 2 | UE6 | 2 |
| 3 | UE7 | 0 |
| 3 | UE8 | 1 |
| 3 | UE9 | 2 |
| 4 | UE10 | 0 |
| 4 | UE11 | 1 |
| 4 | UE12 | 2 |

As apparent therefrom, the uplink radio resource sets are now configured differently, namely in that they can be shared by different UEs in different times, similar to the previous solutions. For instance, the same radio resource 0 is shared by UE1, UE4, UE7, and UE10. It should be noted however that the same radio resource set cannot be used at the same time, since it is assigned to different COT number, i.e., to a different channel occupancy.

According to another example, the following definition of the association between COT number, UE, and radio resource sets can be used. Here, those UEs can be assigned with more than one COT numbers:

| COT number | UE | Uplink radio resource set |
|---|---|---|
| 1, 3 | UE1 | 0 |
| 1, 4 | UE2 | 1 |
| 2 | UE3 | 0 |
| 2 | UE4 | 1 |
| 3 | UE5 | 1 |
| 4 | UE6 | 2 |

The below table is another example of how the association between radio resource sets, UEs and COT numbers can be configured by the gNB, taking into account that UEs can be assigned more than one COT numbers:

| COT number | UE | Uplink radio resource set |
|---|---|---|
| 1, 3 | UE1 | 0 |
| 1 | UE2 | 1 |
| 1 | UE3 | 2 |
| 2, 4 | UE4 | 3 |
| 2 | UE5 | 4 |
| 2 | UE6 | 5 |
| 3, 4 | UE7 | 6 |
| 3 | UE8 | 7 |
| 1, 3 | UE9 | 8 |
| 4 | UE10 | 9 |
| 2, 3, 4 | UE11 | 10 |
| 4 | UE12 | 11 |

In this solution, it may be exemplary assumed that in every COT the gNB reserves some PUCCH resources for SR transmission. On the other hand, in case the gNB would like to dynamically skip providing uplink resources for certain COTs, the gNB may, e.g., use DCI in said respect. For an example, gNB may broadcast 1 bit in DCI format. When UE decode DCI formation, if bit indicates 0, the UE will determine that the gNB has disabled PUCCH resources in this COT and thus will not send SR in this COT. On the other hand, if the bit in the DCI is 1, the UE will determine that the UE can send SR based on the pre configure resources.

Also in the previous solution discussed above with reference to FIG. 6-10, the gNB may provide uplink opportunities for the UEs in its cell in each Channel Occupancy Time, or it may be up to the gNB whether it want to reserve PUCCH resources for SR transmission.

This later table will be exemplary assumed for the following explanation of the solution. Assuming the above exemplary table, from the perspective of one UE, the gNB assigns one or more COT numbers and one dedicated uplink radio resource set to transmit uplink control information (such as the scheduling request). For example, the gNB assigns the COT numbers 1 and 3 as well as the UL radio resource set 0 to UE 1:

| COT number | UE | Uplink radio resource set |
|---|---|---|
| 1, 3 | UE1 | 0 |

As a result, the UE is configured with dedicated uplink radio resources that it may use in the context of transmitting uplink control information such as the scheduling request.

As already explained for the previous solutions and variants thereof, transmissions in unlicensed radio cells typically require the successful CCA of LBT first, in order to first acquire and then perform the transmission on the acquired unlicensed carrier. Also in this solution, the gNB performs the CCA so as to acquire the unlicensed carrier and then allows one or more of the UEs in its unlicensed radio cell to use to the acquired unlicensed carrier to transmit uplink control information.

Correspondingly, the gNB, after successfully acquiring the unlicensed carrier can now determine how to proceed further in providing uplink opportunities for the UEs. In effect, the gNB indicates by a COT number which one or more UEs can perform uplink transmissions of uplink control data (such as the SR).

There can be several implementations on how the gNB determines the COT number to be transmitted in its unlicensed radio cell.

According to one exemplary implementation, the gNB sequentially increases the COT number with every successful occupancy of the unlicensed channel. In particular, when the gNB acquires the unlicensed radio cell after a CCA, the gNB initially may select the COT number 1 to be transmitted in its radio cell. Effectively, this would allow the one or more UEs that are associated with the COT number 1 (in the above table UE1, 2, 3, and 9) to perform an uplink transmission (e.g., SR transmission). The next time the gNB acquires the unlicensed radio cell, the gNB may determine the next COT number, i.e., 2 (i.e., next to the previous COT number 1), such that the one or more UEs that are associated with that COT number 2 (in the above table UE4, 5, 6, and 11). The COT number would thus be sequentially increased by one for each channel occupancy of the gNB. The COT numbers would be cyclically increased, such that the gNB would increase the COT number 4 (previous channel occupancy) to COT number 1 (present channel occupancy) thereby considering that there are only 4 COT numbers.

According to another exemplary implementation, the gNB could determine which COT number (and thus which one or more UEs) to provide with an uplink transmission occasion, based on various different criteria and different manners in a same or similar manner as done in the previous solution. For instance, the determination by the gNB could be based for example on the priorities or capabilities of the UEs.

In any case, the gNB determines one COT number for the current channel occupancy, and transmits this COT number in its radio cell to be received by one or more UEs.

The transmission of the COT number in the radio cell can be implemented in different ways. For instance, the COT number may be implicitly carried by the physical layer signaling, e.g., in the primary synchronization signal (PSS) and/or the secondary synchronization signal (SSS). In another example, the gNB can use any downlink reference signal (such as CSI-RS (Channel State Information Reference Signal, or DMRS, DeModulation Reference Signal). Alternatively, a new reference signal could be defined for carrying the COT.

In one exemplary implementation, the gNB may use a base reference sequence of the PSS and/or SSS and scramble it with the COT number. This base reference sequence would be known at the UE. The UE, upon receiving the PSS and/or SSS, correlates this received signal with base sequences that are scrambled with each possibility of COT number (or only with the COT number with which it was associated). It then selects the COT number that resulted in highest correlation between received signal and base sequence scrambled with this COT number, consequently, the UE is able to obtain the COT number from the synchronization signal.

Another alternative would be to transmit to the COT number using downlink control information, in the same or similar manner as done with the UE group ID explained in the previous solutions. In brief, a DCI could be transmitted using the common or dedicated search space, and being scrambled with either common (such as the SFI-RNTI or others) or dedicated identifiers (such as the C-RNTI or others). Further, the COT number could be included in the content of the DCI, e.g., using a particular field thereof, or could also be implicitly encoded by using the COT number as a scrambling identifier for the scrambling mechanism for the DCI.

Still another possibility could be the use of the system information broadcast mechanism such as system information blocks to carry the COT number.

Based on any of the above mechanism, the COT number is provided to the UEs. The UEs in turn obtain that COT number and may compare the received COT number (as determined by the gNB) with the COT numbers with which they have been initially configured. Put differently, the UE determines whether it is allowed to access the unlicensed radio cell, for transmitting a scheduling request during the shared gNB COT. If the UE is associated with the received COT number, the UE can perform an uplink control information transmission using its configured uplink radio resources. If the UE is not associated with the received COT number, the UE is not allowed to perform an uplink control information transmission at this channel occupancy time; rather the UE has to wait for a later uplink transmission opportunity during another channel occupancy time of the gNB.

It is exemplarily assumed that a scheduling request was previously triggered at the UE (e.g., by a buffer status report) in and is thus available for transmission. In case the UE determines that it is illegible for this channel occupancy time (i.e., received COT number is the same as one of the associated COT numbers), the UE determines the radio resources for transmitting the scheduling request. For instance, the determination of the scheduling request resources is based on the previously configured uplink radio resources as well as on the timing of the received COT number. For instance, in the time domain the preconfigured radio resources for transmitting the scheduling request may be applied relatively to the start of the channel occupancy time, effectively assumed to be the same as the reception of the COT number at the UE. For instance, the UE could apply the SR periodicity and/or SR offset (as part of the preconfigured radio resource set). For example, if the UE has URLLC data or high priority of eMBB traffic, then gNB can schedule SR resource more frequently than usual. For example in that case gNB can schedule SR resource every 3rd COT (for example COT no 1, 3, 6, 9 . . . ) and for medium priority traffic it can schedule every $5^{th}$ COT (for example COT no 5 and 10.).

For example, assuming that the COT number 1 was indicated by the gNB, the UE1, 2, 3, and 9 respectively have been associated with the uplink radio resource set 0, 1, 2, and 8 and thus use those radio resources to transmit the scheduling request in the uplink.

Even though the UE performs a transmission on the unlicensed radio cell, the UE does not need to perform a previous clear channel assessment (CCA). The unlicensed radio cell has been acquired already by the gNB and can thus be used by the UE to transmit the scheduling request. As apparent from FIG. 14 the channel occupancy time (COT) of the gNB ends after the transmission of the scheduling request by the UE.

Moreover, in one exemplary implementation the UE transmits the scheduling request within a brief period of time (exemplary termed CCA-free time period in FIG. 14) after receiving the COT number. For instance, when the switching gap between the downlink (reception of the COT number) and the uplink (transmission of SR) is less than a brief period of time (e.g., 16 microseconds), the UE does not need to perform listen-before-talk to acquire the unlicensed spectrum first. In other words, the reception of the COT number provides the UE with a relative time event to perform (within a specific period of time) the scheduling request transmission using the preconfigured uplink resources so as to avoid performing a CCA on its own.

The procedure may continue after the scheduling request is transmitted from the UE to the gNB in a usual manner; e.g., the gNB may process the scheduling request and does or does not allocate further uplink resources to the UE for a new uplink transmission. This is not illustrated in FIG. 14 because it is not the focus of this application.

This solution has the benefit that it may facilitate avoiding the overhead caused by transmitting a DCI (e.g., by using PSS/SSS). Furthermore, this solution may also benefit in that it is better aligned with the current definition of the PUCCH resource sets, because in this solution and the present PUCCH resource set definition in 5 G and are, the resources are both defined in the frequency and time domain. The present solution however additionally provides a relative point of time (namely reception of the COT number) when these preconfigured frequency and time resources can be used so as to avoid performing a CCA at the UE side.

In particular implementations, the above-described mechanisms and solutions for improving the uplink transmission of the scheduling request in the unlicensed frequency spectrum can be implemented into the existing and future 5G NR framework. For instance, the configuration of the uplink radio resources can be implemented in basically the same manner as the PUCCH resource sets of 5G NR, and may also be configured using the same or similar information elements of the RRC protocol layer. The definitions for the transmission of PSS/SSS currently provided for use in 5G NR, could be reused and adapted to be able to carry the COT number.

Further Aspects

According to a first aspect, a user equipment is provided, which comprises a receiver, processing circuitry and transmitter. The receiver receives, from a base station communicating with the user equipment via an unlicensed radio cell, uplink configuration information to configure at least one set of radio resources of the unlicensed radio cell, the at least one set of radio resources available to the user equipment for transmitting uplink control information, wherein the at least one set of radio resources is associated with a UE group ID indicating a group of user equipment to which the user equipment is associated. The receiver receives, from the base station, downlink control information, DCI, indicating a UE group ID. The processing circuitry determines whether the UE group ID to which the user equipment is associated is the same as the UE group ID received with the downlink control information. The processing circuitry, when determining that the UE group ID to which the user equipment is associated is the same as the UE group ID indicated by the downlink control information, determines scheduling request radio resources within the at least one set of uplink control information radio resources based on the received downlink control information. A transmitter transmits a scheduling request to the base station using the determined scheduling request radio resources.

According to a second aspect provided in addition to the first aspect, the processing circuitry determines the UE group ID from a field of the downlink control information. Optionally, the processing circuitry descrambles an error correction code of the downlink control using a common identifier, such as the Slot-Format-Indicator Radio Network Temporary Identifier, SFI-RNTI, or the Interrupted Transmission Indicator RNTI, INT-RNTI or the System Information RNTI, SI-RNTI of a 5G-NR communication system, or a scheduling-request-specific RNTI. Alternatively, the processing circuitry, when in operation, determines the UE group ID based on descrambling an error correction code of the downlink control information.

According to a third aspect provided in addition to the first or second aspect, the downlink control information is transmitted by the base station during a channel occupancy time during which the base station has acquired the unlicensed radio cell upon a successful clear channel assessment of the unlicensed radio cell.

According to a fourth aspect provided in addition to any of first to third aspects, the downlink control information includes information on scheduling request radio resources to be used for transmitting the scheduling request. The processing circuitry, when in operation, determines whether the scheduling requests radio resources are within the at least one set of uplink control information radio resources. The processing circuitry, when determining that the scheduling request radio resources are within the radio resources of the at least one set of uplink control information radio resources, determines to transmit the scheduling request using the scheduling request radio resources indicated in the downlink control information. Optionally, the processing circuitry, when determining that the scheduling request radio resources are not within the radio resources of the at least one set of uplink control information radio resources, determines to not transmit the scheduling request.

According to a fifth aspect provided in addition to the fourth aspect, the uplink configuration information is received in one or more messages of the Radio Resource Control, RRC, layer.

According to a sixth aspect provided in addition to any of the first to fifth aspects, the DCI is transmitted in a common control information resource region, the common control information resource region being monitored by a plurality of user equipments in the unlicensed radio cell. Optionally, the processing circuitry descrambles an error correction code of the downlink control information using a common identifier.

In addition or alternatively, the DCI is transmitted in a dedicated control information resource region, the dedicated control information resource region being monitored by the user equipment but not by other user equipments in the unlicensed radio cell. Optionally, the processing circuitry, when in operation, descrambles an error correction code of the downlink control information using a dedicated identifier of the user equipment.

According to a seventh aspect provided in addition to any of the first to sixth aspects, the processing circuitry determines that the user equipment does not need to perform a clear channel assessment on the unlicensed radio cell before transmitting the scheduling request, based on the received downlink control information. Optionally, the transmission of the scheduling request is performed within a defined time period after receiving the downlink control information indicating the UE group ID, wherein during the time period the user equipment does not need to perform a clear channel assessment on the unlicensed radio cell for performing a transmission on the unlicensed radio cell.

According to an eighth aspect provided in addition to any of the first to seventh aspects, the receiver receives repetitions of the downlink control information transmitted by the base station, after receiving an initial downlink control information.

According to a ninth aspect provided in addition to any of the first to eighth aspects, the scheduling request, requests, from the base station, uplink radio resources for a further uplink transmission.

According to a tenth aspect, a base station is provided comprising a transmitter and processing circuitry. The transmitter transmits, to one or more user equipment, uplink configuration information to configure at least one set of radio resources of an unlicensed radio cell, the at least one set of radio resources available to the user equipments for transmitting uplink control information in the unlicensed radio cell, wherein the at least one set of radio resources is associated with a UE group ID indicating a group of user equipment to which the user equipment is associated. The processing circuitry performs a clear channel assessment of the unlicensed radio cell. In case the clear channel assessment of the unlicensed radio cell is successful, the processing circuitry determines one of the plurality of UE groups and the associated UE group ID. The transmitter transmits downlink control information to the one or more user equipment, indicating the determined UE group ID.

According to an eleventh aspect provided in addition to the tenth aspect, the base station further comprises a receiver, which receives, from one or more of the user equipment associated with the determined UE group ID, a scheduling request.

According to a twelfth aspect, a method is provided comprising the following steps. The UE receives, from a base station communicating with the user equipment via an unlicensed radio cell, uplink configuration information to configure at least one set of radio resources of the unlicensed radio cell, the at least one set of radio resources available to the user equipment for transmitting uplink control information, wherein the at least one set of radio resources is associated with a UE group ID indicating a group of user equipment to which the user equipment is associated. The UE receives, from the base station, downlink control information, DCI, indicating a UE group ID. The UE determines whether the UE group ID to which the user equipment is associated is the same as the UE group ID received with the downlink control information, When determining that the UE group ID to which the user equipment is associated is the same as the UE group ID indicated by the downlink control information, the UE determines scheduling request radio resources within the at least one set of uplink control information radio resources based on the received downlink control information. The UE transmits a scheduling request to the base station using the determined scheduling request radio resources.

According to a thirteenth aspect, a user equipment is provided comprising a receiver, processing circuitry and a transmitter. The receiver receives, from a base station communicating with the user equipment via an unlicensed radio cell, uplink configuration information to configure at least one set of radio resources of the unlicensed radio cell, the at least one set of radio resources available to the user equipment for transmitting uplink control information, wherein the at least one set of radio resources is associated with one of a plurality of channel occupancy time, COT, numbers. The receiver receives, from the base station, a channel occupancy signal including a COT number. The processing circuitry determines whether the received COT number is the same as one of the COT numbers associated with the at least one set of radio resources. The processing circuitry, when determining that the received COT number is the same as one of the COT numbers associated with the at least one set of radio resources, determines scheduling request radio resources within the at least one set of radio resources based on the received channel occupancy signal. The transmitter transmits a scheduling request to the base station using the determined scheduling request resources.

According to a fourteenth aspect, provided in addition to the thirteenth aspect, the channel occupancy signal is transmitted using one or more synchronization signals broadcast by the base station in the unlicensed radio cell. Optionally, a scrambling reference signal sequence can be used. Alternatively, the channel occupancy signal is transmitted as downlink control information in a downlink resource region monitored by the user equipment.

According to a fifteenth aspect provided in addition to the thirteenth or fourteenth aspects, the processing circuitry determines that the user equipment does not need to perform a clear channel assessment on the unlicensed radio cell before transmitting the scheduling request, based on the received channel occupancy signal. Optionally, the transmission of the scheduling request is performed within a defined time period after receiving the downlink control information, wherein during the time period the user equipment does not need to perform a clear channel assessment on the radio for performing a transmission.

According to a sixteenth aspect, a base station is provided comprising a transmitter and processing circuitry. The transmitter transmits, to one or more user equipment, uplink configuration information to configure at least one set of radio resources of an unlicensed radio cell, the at least one set of radio resources available to the user equipments for transmitting uplink control information in the unlicensed radio cell, wherein the at least one set of radio resources is associated with one of a plurality of channel occupancy time, COT, numbers. The processing circuitry performs a clear channel assessment of the unlicensed radio cell. In case the clear channel assessment of the unlicensed radio cell is successful, the processing circuitry determines one of the plurality of COT numbers. The transmitter transmits a channel occupancy signal, to the one or more user equipment, indicating the determined COT number.

According to a seventeenth aspect, provided in addition to the sixteenth aspect, the base station further comprises a receiver, which receives, from one or more of the user equipment associated with the determined COT number, a scheduling request.

According to the eighteenth aspect, provided in addition to the sixteenth or seventeenth aspects, the processing circuitry determines one of the plurality of COT number in a sequential manner for each channel occupancy, choosing the next COT number after the COT number previously determined. Alternatively, the processing circuitry determines one of the plurality of COT number based on the one or more user equipment to be provided with an occasion to transmit a scheduling request.

According to a nineteenth aspect, a method is provided comprising the following steps performed by a user equipment. The UE receives, from a base station communicating with the user equipment via an unlicensed radio cell, uplink configuration information to configure at least one set of radio resources of the unlicensed radio cell, the at least one set of radio resources available to the user equipment for transmitting uplink control information, wherein the at least one set of radio resources is associated with one of a plurality of channel occupancy time, COT, numbers. The UE receives, from the base station, a channel occupancy signal including a COT number. The UE determines, whether the received COT number is the same as one of the COT numbers associated with the at least one set of radio resources. When determining that the received COT number is the same as one of the COT numbers associated with the at least one set of radio resources, the UE determines scheduling request radio resources within the at least one set of radio resources based on the received channel occupancy signal. The UE transmits a scheduling request to the base station using the determined scheduling request resources.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, UE, comprising:
a receiver, which in operation, receives, from a base station communicating with the user equipment via an unlicensed radio cell, uplink configuration information to configure at least one set of radio resources of the unlicensed radio cell, the at least one set of radio resources being available to the user equipment for transmitting uplink control information, wherein the at least one set of radio resources is associated with a UE group ID indicating a group of user equipment with which the user equipment is associated, the receiver, which in operation, receives, from the base station, downlink control information, DCI, including a field indicating the UE group ID;
processing circuitry, which in operation, determines whether the UE group ID with which the user equipment is associated is the same as the UE group ID indicated by the downlink control information, the processing circuitry, when determining that the UE group ID with which the user equipment is associated is the same as the UE group ID indicated by the downlink control information, determines scheduling request radio resources within at least one set of uplink control information radio resources based on the downlink control information; and a transmitter, which in operation, transmits a scheduling request to the base station using the determined scheduling request radio resources, wherein:
in response to the transmitter, in operation, transmitting the scheduling request before an expiration of a first time period that commences from reception of the DCI, the user equipment does not perform a clear channel assessment on the unlicensed radio cell prior to transmitting the scheduling request, wherein the first time period is 0.16% to 1.6% of a channel occupancy time of the base station, and in response to the transmitter, in operation, transmitting the scheduling request after the expiration of the first time period, the user equipment performs the clear channel assessment prior to transmitting the scheduling request.

2. The user equipment according to claim 1,
wherein the processing circuitry, when in operation, determines the UE group ID from the field of the downlink control information, wherein the processing circuitry, when in operation, descrambles an error correction code of the downlink control using a Slot-Format-Indicator Radio Network Temporary Identifier, SFI-RNTI, an Interrupted Transmission Indicator RNTI, INT-RNTI, or a System Information RNTI, SI-RNTI, of a 5G-NR communication system or a scheduling-request-specific RNTI.

3. The user equipment according to claim 1 wherein the downlink control information is transmitted by the base station during the channel occupancy time during which the base station has acquired the unlicensed radio cell upon a successful clear channel assessment of the unlicensed radio cell.

4. The user equipment according to claim 1, wherein:
the downlink control information includes information on scheduling request radio resources to be used for transmitting the scheduling request,
the processing circuitry, when in operation, determines whether the scheduling requests radio resources are within the at least one set of uplink control information radio resources,
the processing circuitry, when determining that the scheduling request radio resources are within the radio resources of the at least one set of uplink control information radio resources, determines to transmit the scheduling request using the scheduling request radio resources indicated in the downlink control information, and
the processing circuitry, when determining that the scheduling request radio resources are not within the radio resources of the at least one set of uplink control information radio resources, determines to not transmit the scheduling request.

5. The user equipment according to claim 1, wherein the uplink configuration information is received in one or more messages of a Radio Resource Control, RRC, layer.

6. The user equipment according to claim 1, wherein:
the DCI is transmitted in a common control information resource region, the common control information resource region being monitored by a plurality of user equipment in the unlicensed radio cell, wherein the processing circuitry, when in operation, descrambles an error correction code of the downlink control information using a common identifier, and/or
the DCI is transmitted in a dedicated control information resource region, the dedicated control information resource region being monitored by the user equipment but not by other user equipment in the unlicensed radio cell, wherein the processing circuitry, when in operation, descrambles an error correction code of the downlink control information using a dedicated identifier of the user equipment.

7. The user equipment according to claim 1, wherein the receiver, when in operation, receives repetitions of the downlink control information transmitted by the base station, after receiving an initial downlink control information.

8. The user equipment according to claim 1, wherein the scheduling request, requests, from the base station, uplink radio resources for a further uplink transmission.

9. The user equipment according to claim 1, wherein the channel occupancy time of the base station is 1 milliseconds (ms) to 10 ms, and the first time period is 16 microseconds (μs).

10. A system, comprising:
a base station including:
a transmitter, which in operation, transmits, to one or more user equipment, uplink configuration information to configure at least one set of radio resources of an unlicensed radio cell, the at least one set of radio resources being available to the one or more user equipment for transmitting uplink control information in the unlicensed radio cell, wherein the at least one set of radio resources is associated with a UE group ID indicating a group of user equipment with which a user equipment is associated; and
processing circuitry, which in operation, performs a clear channel assessment of the unlicensed radio cell, in case the clear channel assessment of the unlicensed radio cell is successful, the processing circuitry, when in operation, determines one of a plurality of UE groups and the associated UE group ID, wherein:
the transmitter, in operation, transmits downlink control information, DCI, to the one or more user equipment, including a field indicating the associated UE group ID; and
a user equipment including:
a receiver, which in operation, receives the DCI;
processing circuitry, which in operation, determines scheduling request radio resources within at least one set of radio resources based on the DCI; and
a transmitter, which in operation, transmits a scheduling request to the base station using the scheduling request radio resources, wherein:
in response to the user equipment transmitting the scheduling request before an expiration of a first time period that commences from reception of the DCI, the user equipment does not perform the clear channel assessment on the unlicensed radio cell prior to transmitting the scheduling request, wherein the first time period is 0.16% to 1.6% of a channel occupancy time of the base station, and
in response to the user equipment transmitting the scheduling request after the expiration of the first time period, the user equipment performs the clear channel assessment prior to transmitting the scheduling request.

11. The system according to claim 10, wherein the base station includes:
a receiver, which in operation, receives the scheduling request.

12. The system according to claim 10, wherein the channel occupancy time of the base station is 1 milliseconds (ms) to 10 ms, and the first time period is 16 microseconds (μs).

* * * * *